(12) United States Patent
McCullough et al.

(10) Patent No.: US 7,505,572 B2
(45) Date of Patent: Mar. 17, 2009

(54) CALLER INFORMATION SYSTEM

(75) Inventors: William McCullough, Costa Mesa, CA (US); Brian Maguire, Santa Ana, CA (US); Karen Maguire, Santa Ana, CA (US); Richard Goldberg, Lake Forest, CA (US); Marla Goldberg, Lake Forest, CA (US)

(73) Assignee: OC Concepts, Inc., Costa Mesa, CA (US)

( * ) Notice: Subject to any disclaimer, the term of this patent is extended or adjusted under 35 U.S.C. 154(b) by 301 days.

(21) Appl. No.: 10/847,537

(22) Filed: May 17, 2004

(65) Prior Publication Data

US 2004/0264660 A1    Dec. 30, 2004

Related U.S. Application Data

(60) Provisional application No. 60/471,917, filed on May 20, 2003.

(51) Int. Cl.
*H04M 11/00*    (2006.01)
(52) U.S. Cl. .............. 379/93.17; 379/90.01; 379/93.25; 370/352
(58) Field of Classification Search .............. 379/93.17, 379/93.23, 93.25, 142.06, 265.09
See application file for complete search history.

(56) References Cited

U.S. PATENT DOCUMENTS

| | | | |
|---|---|---|---|
| 4,797,911 A * | 1/1989 | Szlam et al. ............. | 379/88.22 |
| 5,008,930 A | 4/1991 | Gawrys et al. | |
| 5,181,239 A | 1/1993 | Jolissaint | |
| 5,511,117 A | 4/1996 | Zazzera | |
| 5,546,452 A | 8/1996 | Andrews et al. | |
| 5,555,299 A | 9/1996 | Maloney et al. | |
| 5,684,870 A | 11/1997 | Maloney et al. | |
| 5,715,307 A | 2/1998 | Zazzera | |
| 5,796,812 A | 8/1998 | Hanlon et al. | |
| 5,878,130 A | 3/1999 | Andrews et al. | |
| 5,915,010 A | 6/1999 | McCalmont | |
| 5,937,051 A | 8/1999 | Hurd et al. | |
| 5,966,695 A | 10/1999 | Melchione et al. | |
| 6,014,647 A | 1/2000 | Nizzari et al. | |

(Continued)

OTHER PUBLICATIONS www.whoscalling.com/home/services.html; Web site; 36 pages printed Sep. 13, 2004.

(Continued)

*Primary Examiner*—Stella L Woo
(74) *Attorney, Agent, or Firm*—Alford Law Group, Inc.; Bill Alford; Brent Folsom

(57) ABSTRACT

A system is provided for managing telephone calls made to special service numbers. Information extracted from incoming telephone calls can be received by a system server and cross-referenced with a database to obtain cross-referenced caller information pertaining to previous customer telephone calls and/or in person customer meetings. The cross-referenced caller information can be passed to a client workstation and displayed to the user in the form of an industry-specific template formatted in accordance with the business needs of the user. The template can be automatically populated with the cross-referenced caller information. During the telephone call, the user can view and update the caller information, thereby maintaining a retrievable record of the telephone call. With regard to the multi-housing industry in particular, caller information can be displayed in the form of a guest card template and/or a service card template.

21 Claims, 24 Drawing Sheets

U.S. PATENT DOCUMENTS

| | | | |
|---|---|---|---|
| 6,049,602 A * | 4/2000 | Foladare et al. | 370/352 |
| 6,070,142 A | 5/2000 | McDonough et al. | |
| 6,108,711 A | 8/2000 | Beck et al. | |
| 6,115,693 A | 9/2000 | McDonough et al. | |
| 6,134,530 A | 10/2000 | Bunting et al. | |
| 6,138,139 A | 10/2000 | Beck et al. | |
| 6,167,395 A | 12/2000 | Beck et al. | |
| 6,170,011 B1 | 1/2001 | Macleod Beck et al. | |
| 6,185,290 B1 * | 2/2001 | Shaffer et al. | 379/220.01 |
| 6,212,178 B1 | 4/2001 | Beck et al. | |
| 6,215,865 B1 | 4/2001 | McCalmont | |
| 6,230,197 B1 | 5/2001 | Beck et al. | |
| 6,332,154 B2 | 12/2001 | Beck et al. | |
| 6,337,905 B1 | 1/2002 | Mizuta et al. | |
| 6,370,508 B2 | 4/2002 | Beck et al. | |
| 6,381,640 B1 | 4/2002 | Beck et al. | |
| 6,393,018 B2 | 5/2002 | Miloslavsky | |
| 6,404,884 B1 | 6/2002 | Marwell et al. | |
| 6,470,079 B1 | 10/2002 | Benson | |
| 6,539,419 B2 | 3/2003 | Beck et al. | |
| 6,574,605 B1 | 6/2003 | Sanders et al. | |
| 6,581,067 B1 | 6/2003 | Bjergo et al. | |
| 6,798,768 B1 * | 9/2004 | Gallick et al. | 370/352 |
| 6,965,870 B1 * | 11/2005 | Petras et al. | 705/14 |
| 2002/0046086 A1 * | 4/2002 | Pletz et al. | 705/14 |
| 2002/0116232 A1 * | 8/2002 | Rapp et al. | 705/5 |
| 2003/0002479 A1 * | 1/2003 | Vortman et al. | 370/352 |
| 2003/0228007 A1 * | 12/2003 | Kurosaki | 379/142.06 |

OTHER PUBLICATIONS www.realpage.com/products/Property_Management/OneSite_Leasing_Rents/ "OneSite Leasing & Rents"; Web site page printed Aug. 4, 2004.

www.realpage.com/products/Property_Management/OneSite_Leasing_Rents/ "Take the Tour"; Web site page printed Aug. 4, 2004.

www.eetimes.com/pressreleases/bizwire/44922 "SCS Announces Release of Remote Screen Pop Transfer"; Web site page printed Aug. 4, 2004.

www.strategicinc.com/products/asdm/news.asp "What's New"; Web site pages printed Aug. 5, 2004.

* cited by examiner

Welcome to our Community!

First Name: _____ Middle Initial: _____ Last Name: _____ Date/Time: _____
Address: _____
City: _____ State: _____ Zipcode: _____
Daytime Phone: _____ Evening Phone: _____
Email Address: _____ Email _____
Notes: _____

Apartment Home Desired

☐ Efficiency  ☐ Studio  ☐ 1 Bedroom  ☐ 2 Bedroom/1 Bath  ☐ 2 Bedroom/2 Baths  ☐ 3 Bedroom Price Range: _____ Number of Occupants: _____ Pets: _____

How Did You Hear About Us?

☐ For Rent Magazine  ☐ Apt. Guide  ☑ Original Apt. Magazine  ☐ Newspaper
☐ Referral  ☐ Other:

It is our policy to provide apartments to prospective residents without regard to race, sex, color, religion, national origin, familial status or handicap.

[ Leasing Office Information ]        [ Print ]   [ Save and Exit ]

FIG. 8A

Welcome to our Community! - Leasing Office Information

First Name: _____ Middle Initial: _____ Last Name: _____ Date/Time: _____

Address: _____

City: _____ State: _____ Zipcode: _____

Daytime Phone: _____ Evening Phone: _____

Email Address: _____ Email _____

Leasing Consultant: _____ Apartment # Shown: _____

What Size Shown: _____ Date Needed: _____

Apartment Rented: _____ Type: _____

Reason Did Rent: _____

Reason Did Not Rent: _____

Follow-up (24 Hours): _____

Follow-up (1 Week): _____

Follow-up (2 Weeks): _____

Back To Front Card          Print          Save and Exit

FIG. 8B

Maintenance Service Request Form

600

First Name: _____ Middle Initial: ___ Last Name: _____

Address: _____

Home Phone: _____ Work Phone: _____ Date: _____

Manager Approval: ☑ Yes ☐ No  Pets: ☐ Yes ☑ No  Permission To Enter My Home: ☑ Yes ☐ No Problem: _____

Maintenance Service Completed

Completed: ☑ Yes ☐ No   By: _____   Date: _____

Time In: _____   Time Out: _____   Time Spent: _____

Comment: _____

Print    Save and Exit

FIG. 8C

Customer Records

Prospect/Guest Inquiries

Last Prospect/Guest Inquiry
Prospect/Guest Inquiries for the last 24 hours
Prospect/Guest Inquiries for the last 30 days
Prospect/Guest Inquiries by Date Range

Service Requests

Last Service Request
Service Requests for the last 24 hours
Service Requests for the last 30 days
Service Requests by Date Range

Performance Analysis Reports (available last 30 days, 90 days and 180 days)

Ad Campaign Reports

Total calls per campaign
Total tours per campaign
Percentage of tours per campaign
Total rentals per campaign
Percentage of rentals per campaign

Team Performance Reports

Total appointments set
Total tours
Total follow-ups
Total rentals
Total requests for each bedroom size
Percentage of requests for each bedroom size

Leasing Agent Performance Reports

Total calls per leasing agent
Total appointments per leasing agent
Total follow-ups per leasing agent
Total tours per leasing agent
Total rentals per leasing agent

FIG. 12E

CALLER INFORMATION SYSTEM

CROSS-REFERENCE TO RELATED APPLICATIONS

This application relates to and claims the benefit of U.S. Provisional Application No. 60/471,917 filed May 20, 2003 and entitled Real-Time Caller Information System, which is incorporated by reference herein.

STATEMENT RE: FEDERALLY SPONSORED RESEARCH/DEVELOPMENT

Not Applicable.

BACKGROUND OF THE INVENTION

Many industries rely on advertising to attract a steady flow of qualified customers. Advertising campaigns may cost thousands of dollars and utilize various media, such as newspapers, magazines, yellow pages, television and direct mailings. In the multi-housing industry, for example, advertising expenses are second only to capital expenditures. Hence, both advertisers and marketing firms are highly motivated to verify the cost-effectiveness of advertising media and advertising campaigns.

Nevertheless, many conventional methods of advertising fail to successfully utilize technology to conduct a sufficiently cost-effective operation. For example, in the traditional model for renting apartment units in the multi-housing industry, a potential customer may provide preliminary information over the telephone to a sales/office representative. The representative may be forced to manually write down the caller's information onto a "guest card" which is used to maintain a record of the call. Given the nature of such a manual system, it can become difficult and/or nearly impossible for a sales/office representative to efficiently keep track of the potentially large number of calls received by the rental office. In the case of a repeat caller, it may be desirable for the representative to quickly retrieve information concerning one or more prior calls made from the same telephone number. Unfortunately, manual-based systems have inherent limitations involved in physically locating and pulling relevant paper files, all of which costs valuable time.

Accordingly, there exists a need for a comprehensive caller information system which provides a streamlined approach to processing incoming telephone calls that are placed in response to advertisements. It would be desirable for such a system to maintain records of past calls, and provide an efficient way to retrieve such records in realtime.

BRIEF SUMMARY OF THE INVENTION

The present invention, roughly described, is directed to a system for managing telephone calls. In various embodiments, the system can include a system server, one or more client workstations, and a database. In certain embodiments, the database is configured to store caller information pertaining to telephone calls made to special service numbers that are received by the system. Information extracted from the incoming telephone calls can be received by the system server and cross-referenced with the database to obtain cross-referenced caller information pertaining to previous telephone calls placed by the same caller or from the same telephone number. The cross-referenced information can be passed to a client workstation associated with the special service number, for review by a user of the system.

When the user selects an incoming telephone call, the cross-referenced information can be displayed to the user on the client workstation. During the telephone call, the user can update the cross-referenced caller information and enter additional information pertaining to the telephone call, thereby maintaining a retrievable record of the incoming telephone call. The record can be subsequently recalled as cross-referenced caller information upon a subsequent telephone call placed by the caller or placed from the caller's telephone.

In certain applications, the system can be used by advertisers to manage incoming telephone calls made to special service numbers. Caller information can be displayed to a representative of the advertiser (i.e. a user) in the form of an industry-specific template formatted in accordance with the business needs of the user. The template can be automatically populated with the cross-referenced caller information and displayed on the client workstation. With regard to the multi-housing industry in particular, caller information can be displayed in the form of a guest card template and/or a service card template.

The system can be configured for use with a telephony server capable of extracting ANI and/or DNIS information from incoming telephone calls, thereby enabling the system server to cross-reference such extracted information with the database and/or various other databases available over a computer network.

Additional functionality can be provided for integrating caller information received in person from "walk-in" customers, managing authorized users, managing advertising sources/campaigns, generating reports/records, monitoring transactions performed by the system server, monitoring the client workstations, and other functionality described herein.

These and other embodiments of the present invention are discussed in further detail below.

BRIEF DESCRIPTION OF THE DRAWINGS

FIGS. 8A and 8B illustrate a guest card template which can be used in accordance with an embodiment of the present invention.

FIG. 8C illustrates a service card template which can be used in accordance with an embodiment of the present invention.

FIGS. 12A-E provide examples of screenshots that can be displayed in accordance with an embodiment of the present invention.

DETAILED DESCRIPTION OF THE INVENTION

Figure 1:
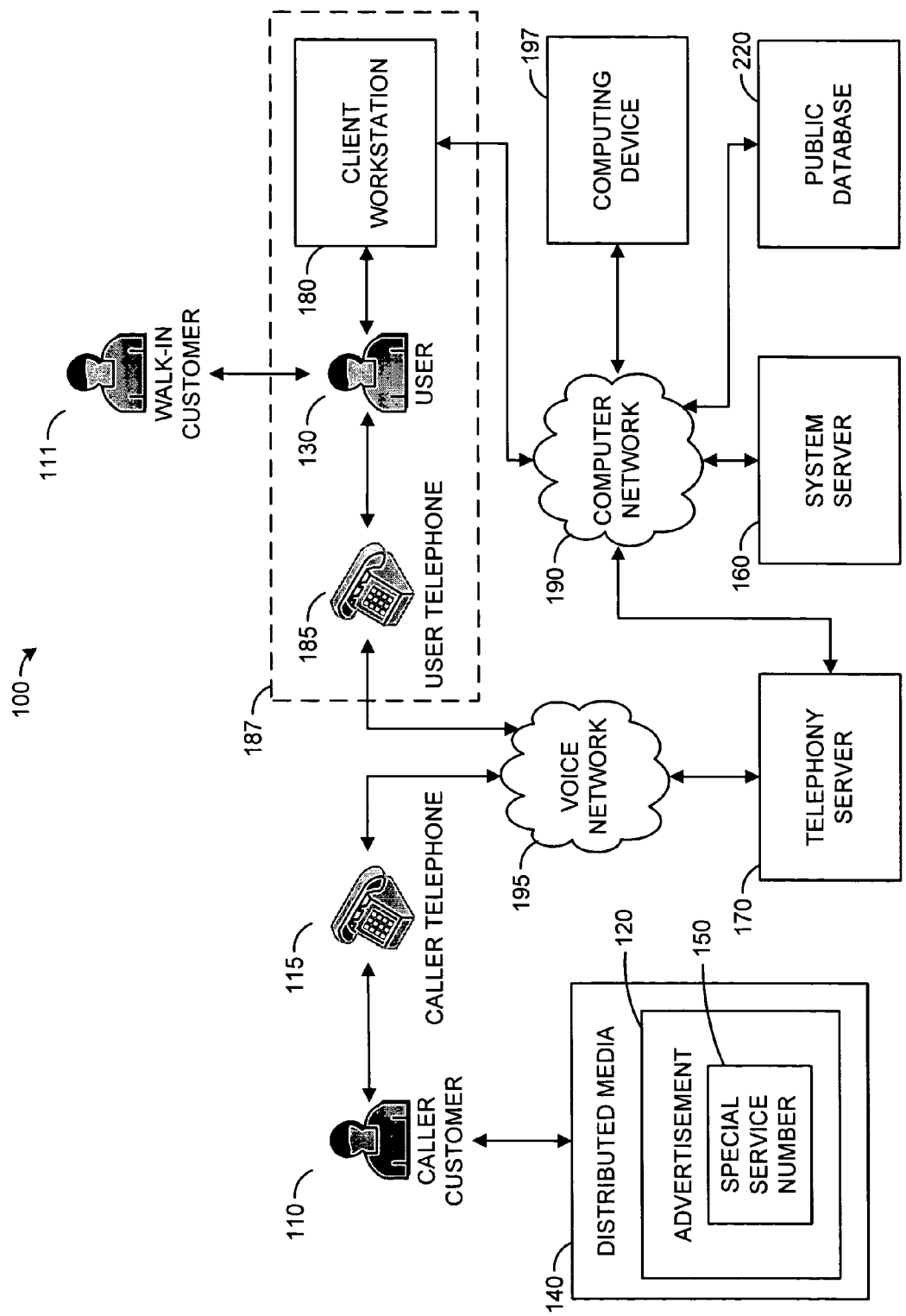
FIG. 1 is a block diagram illustrating various components of a caller information system and related elements that interact with the system in accordance with an embodiment of the present invention.

FIG. 1 is a block diagram illustrating various components of a caller information system 100, and related elements that interact with the system 100, in accordance with an embodiment of the present invention. As further described herein, various embodiments of system 100 can advantageously extract, store, display, and/or update information ("caller information") relating to telephone calls placed by one or more caller customers 110 or relating to meetings with one or more walk-in customers 111.

Caller information can comprise any customer information of a caller 110 and/or a walk-in customer 111, including but not limited to: any information extracted from an incoming telephone call; any previously stored information relating to a caller 110, the caller's 110 telephone number, a walk-in customer 111, and/or the walk-in customer's 111 telephone number; any information entered by a user 130 of system 100 relating to the caller 110 during and/or after a telephone call placed by the caller 110; and/or any information entered by a user 130 of system 100 relating to the walk-in customer 111 during and/or after a meeting with the walk-in customer 111. For example, when system 100 is used in the context of the multi-housing industry, caller information can include personal information regarding the caller 110/walk-in customer 111 (i.e. name, address, telephone number, etc.), the substance of previous conversations between caller 110/walk-in customer 111 and a user 130 (i.e. a sales/office representative) of system 100, any previous preferences communicated from caller 110/walk-in customer 111 to a user 130 (i.e. what type of apartment home is desired by caller 110/walk-in customer 111), and any other information which may be useful to conducting rental transactions. Similarly, calls or meetings may be initiated by callers 110 or walk-in customers 111, respectively, having service requests directed toward the managing entity of a rental property. In such applications, the caller information processed by system 100 can be directed toward information relevant to service transactions.

A user 130 of system 100 can conduct a telephone conversation with a caller 110, while simultaneously and/or subsequently interacting with a client workstation 180 to review, enter, recall, and/or update current and/or previously stored caller information associated with the caller 110 or the caller's 110 telephone number. As a result, the system 160 can provide users 130 with the functionality to create an electronic record of a telephone conversation placed by a caller 110, and include in that record any applicable caller information that may be desirable to review and/or cross-reference with future calls at a later date.

Although the present disclosure generally refers to one or more callers 110 interacting with user 130 by telephone, various embodiments of the present invention can also provide functionality for integrating information received from one or more "walk-in" customers 111 that physically appear in person to user 130 through walk-ins, scheduled appointments, or otherwise. For example, any information provided by a walk-in customer to user 130 in person can be considered caller information. Such caller information received in person from walk-in customer 111 can be entered by user 130 into client workstation 180 and can therefore be handled by system 100 in the same manner as caller information received pursuant to a telephone call placed by a caller 110. As a result, system 100 can provide users 130 with the ability to cross-reference caller information received in relation to callers 110 with caller information received in relation to walk-in customers 111, and vice versa. Therefore, if a caller 110 has previously appeared before user 130 as a walk-in customer 111, or vice versa, the caller information associated with the caller 110/walk-in customer 111 or the caller's 110/walk-in customer's 111 telephone number can be conveniently cross-referenced and displayed to user 130 in connection with the user's 130 further interactions with the caller 110 or walk-in customer 111.

The primary components of system 100 include system server 160, telephony server 170, and client workstation 180. Telephony server 170 receives telephone calls placed by caller 110 from caller telephone 115 over voice network 195. It will be appreciated that voice network 195 can be any of the various networks known in the art to facilitate voice transmission, including but not limited to a conventional public switched telephone network (PSTN), a wireless telephone network, a network employing a voice over Internet protocol (VoIP), and/or others known in the art.

In various embodiments, telephony server 170 can extract Automatic Number Identification (ANI) information, Dialed Number Identification Service (DNIS) information, and/or other information from incoming telephone calls. As a result of this extraction, system 100 can be provided with the name and telephone number associated with caller telephone 115 (indicated by the ANI information) and/or a special service number 150 called by caller 110 (indicated by the DNIS information).

Telephony server 170 passes the extracted information to system server 160 through computer network 190, and forwards the telephone calls to the appropriate destination number at user telephone 185. Optionally, telephony server 170 can connect to system server 160 directly (not shown). Moreover, the functionality of the telephony server 170 can be optionally integrated into system server 160, as further described herein. If such an implementation is desired, the system server 160 can communicate directly with the voice network 195, rather than through telephony server 170.

System server 160 can use the extracted caller information to recall any previously stored caller information associated with the caller 110/walk-in customer 111 or the caller's 110/walk-in customer's 111 telephone number, format all of the caller information, and send the formatted caller information to a corresponding client workstation 180 for display. In various embodiments, system server 160 can listen for any incoming requests from client workstations 180 or telephony servers 170 that have registered with system server 160.

Client workstation 180 interacts with system server 160 over computer network 190 to permit a user 130 to view the caller information forwarded from system server 160 (including the extracted caller information and previously stored caller information), as well as to add and/or modify caller information as desired. It will be appreciated that computer network 190 can be any of the various networks known in the art to facilitate data transmission, including but not limited to a wide area network (WAN), the Internet, a virtual private network (VPN), and/or others known in the art.

In various embodiments, communication between system server 160 and client workstation 180 can be facilitated by .NET remoting technology, available from Microsoft Corporation, through TCP or HTTP. In one embodiment, the interaction is configured using a TCP port with a binary formatter. However, other embodiments employing custom communication methods are also contemplated. System server 160 can also interact with a public database 220, such as an online telephone white pages and/or other information repositories known in the art to obtain additional caller information, such as an address associated with the caller 110/walk-in customer 111 or the caller's 110/walk-in customer's 111 telephone number.

FIG. 1 further illustrates optional computing device 197 which can be any computing device known in the art for communicating with system server 160 over computer network 190. In various embodiments, computing device 197 provides a way for developers to interact with system server 160 for performing various monitoring functions, as further described herein. Computing device 197 can also be used by users 130 for accessing system server 160 over the Internet through a browser-based interface while away from a client workstation 180.

In another aspect of the present invention, system 100 provides functionality for generating reports and implementing various administrative tools, as further described herein.

As is known in the art, advertisers often use special service numbers to determine the effectiveness of advertising. By placing different special service numbers in advertisements, advertisers can determine the effectiveness of a given advertisement by monitoring calls made to the particular special service number associated with the advertisement.

System 100 can be used by an advertiser in order to efficiently handle telephone calls initiated by callers 110 in response to advertisements. For example, a caller 110 (i.e. a potential customer) may review an advertisement 120 that is listed in a distributed media publication 140. It will be appreciated that media 140 may be any advertising medium known in the art, including but not limited to printed publications and/or electronic (i.e. online) publications. Advertisement 120 provides a special service number 150 for the caller 110 to use in contacting the advertiser.

If the caller 110 desires to contact the advertiser, the caller 110 can initiate a call by dialing the special service number 150 using the caller's telephone 115. After the special service number 150 is dialed, the call is routed through voice network 195 to telephony server 170 which is associated with the special service number 150. As previously described, telephony server 170 extracts caller information from the call and passes the extracted information to system server 160. Telephony server 170 also routes the call to user telephone 185. As also previously described, system server 160 can recall additional caller information and forward the extracted and recalled caller information to client workstation 180.

User 130 can receive the call when it is routed to user telephone 185. Typically, user 130 will be a person associated with the advertiser, such as a sales/office representative, who is responsible for responding to incoming customer telephone calls. User 130 has access to client workstation 180 which is in communication with system server 160 over computer network 190. Client workstation 180 provides a user interface (such as a graphical user interface) to user 130 which permits user 130 to interact with the client workstation 180 and view caller information forwarded by system server 160.

User 130, user telephone 185, and client workstation 180 can be situated at an office 187 of an advertiser. For convenience of illustration, only one client workstation 180, user 130, and user telephone 185 are shown in FIG. 1. However, it will be appreciated that a plurality of client workstations 180 and/or user telephones 185 can be employed in one or more offices 187, with various associated users 130. In order to facilitate communication between system server 160 and different offices 187, a unique "OfficeID" identifier can be associated with each office 187 and used in communications between client workstation 180 and system server 160.

Figure 2:
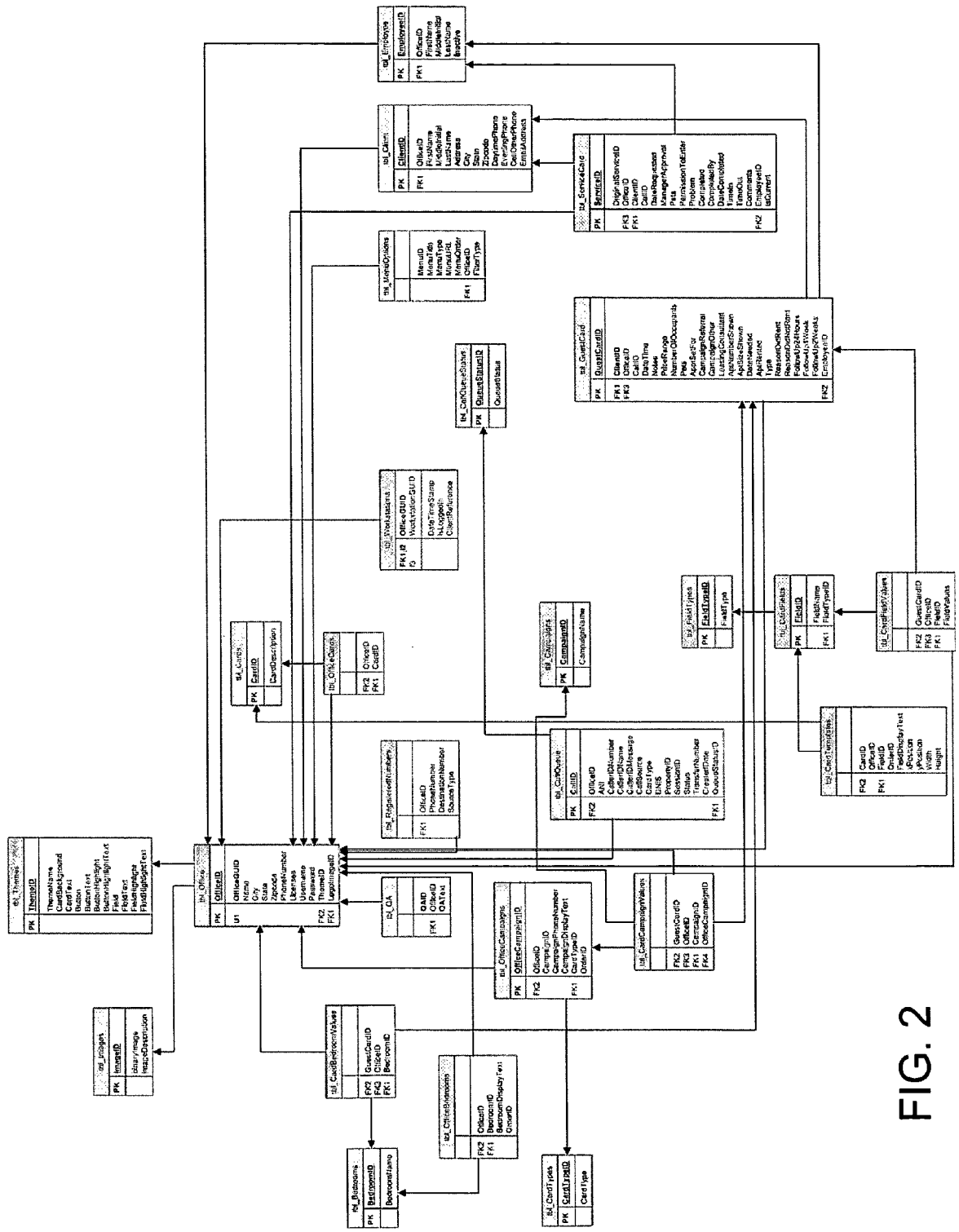
FIG. 2 illustrates a plurality of database schema tables which can be used in accordance with an embodiment of the present invention.

FIG. 2 illustrates a plurality of database schema tables which can be used in accordance with an embodiment of the present invention. It will be appreciated that the data structures set forth in the tables of FIG. 2 can be used to facilitate the storage and processing of caller information by system 100 as well as communication between the various components of system 100 and related elements, as further described herein.

Figure 3A:
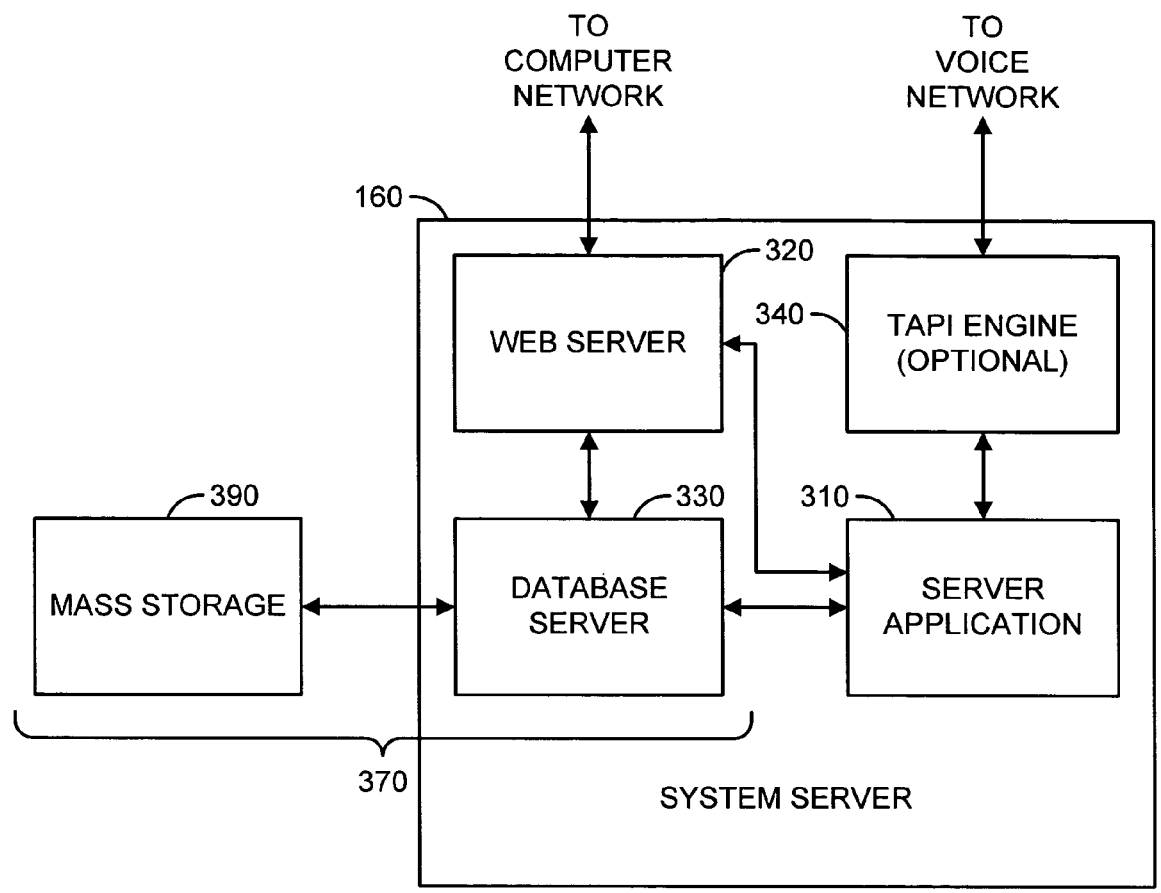
FIG. 3A is a block diagram illustrating various components of a system server of a caller information system in accordance with an embodiment of the present invention.

FIG. 3A is a block diagram illustrating various components of system server 160 of caller information system 100 in accordance with an embodiment of the present invention. In one embodiment, system server 160 is implemented as a generic personal computer having a Pentium 4 processor at 1.8 GHz, 1 GB of RAM, and 140 GB of disk storage. As illustrated in FIG. 3A, system server 160 provides a server application 310 for facilitating processing to be performed by system server 160. A database server 330 in communication with mass storage 390 is also provided. In one embodiment, database server 330 is a MS SQL Server 2000. It will be appreciated that database server 330 and mass storage 390 can collectively provide a system server database 370 for storing and recalling caller information. A web server 320 provides Internet communication to system server 160. In one embodiment, web server 320 is a MS Windows 2000 server. It will be appreciated that various technology known in the art can be used to facilitate communication between web server 320 and the computer network 190, including DSL, telephone line, cable, and others. For example, a modem can be provided which provides DSL communication between web server and a central office local switch which is in communication with the internet and PSTN.

As illustrated, server 160 can communicate with computer network 190 through web server 320. Optionally, the functionality of telephony server 170 can be incorporated into system server 160 through a telephony application programming interface (TAPI) engine 340. For example, TAPI engine 340 can respond to incoming calls and transfer such calls to a user telephone 185. As a result, server 160 can communicate with voice network 195 through TAPI engine 340. In one embodiment, TAPI engine 340 is an amTAPI Pro V1.12 available from Allen-Martin. It will be appreciated that various technology known in the art can be used to facilitate communication between TAPI engine 340 and voice network 195. For example, a telephony card can be employed which provides T1 communication between TAPI engine 340 and a central office local switch which is in communication with the Internet and PSTN. In one embodiment, a Vantage PCI/4L telephony card available from Brooktrout Technology can be employed, having a T1 voice line, and the modem 350 has a DSL data line. Thus, depending on the implementation employed in a given embodiment of system 100, incoming telephone calls can be routed through system server 160 (using TAPI engine 340) and/or routed through telephony server 170, thereby relieving system server 160 of the overhead of routing telephone calls. A client DLL application program interface (API) (not shown) can also run on system server 160 to facilitate communication between system server 160 and other components of system 100. In one embodiment, the client DLL application can be required to register with system server 160 by passing a ServerGuid data structure.

Figure 3B:
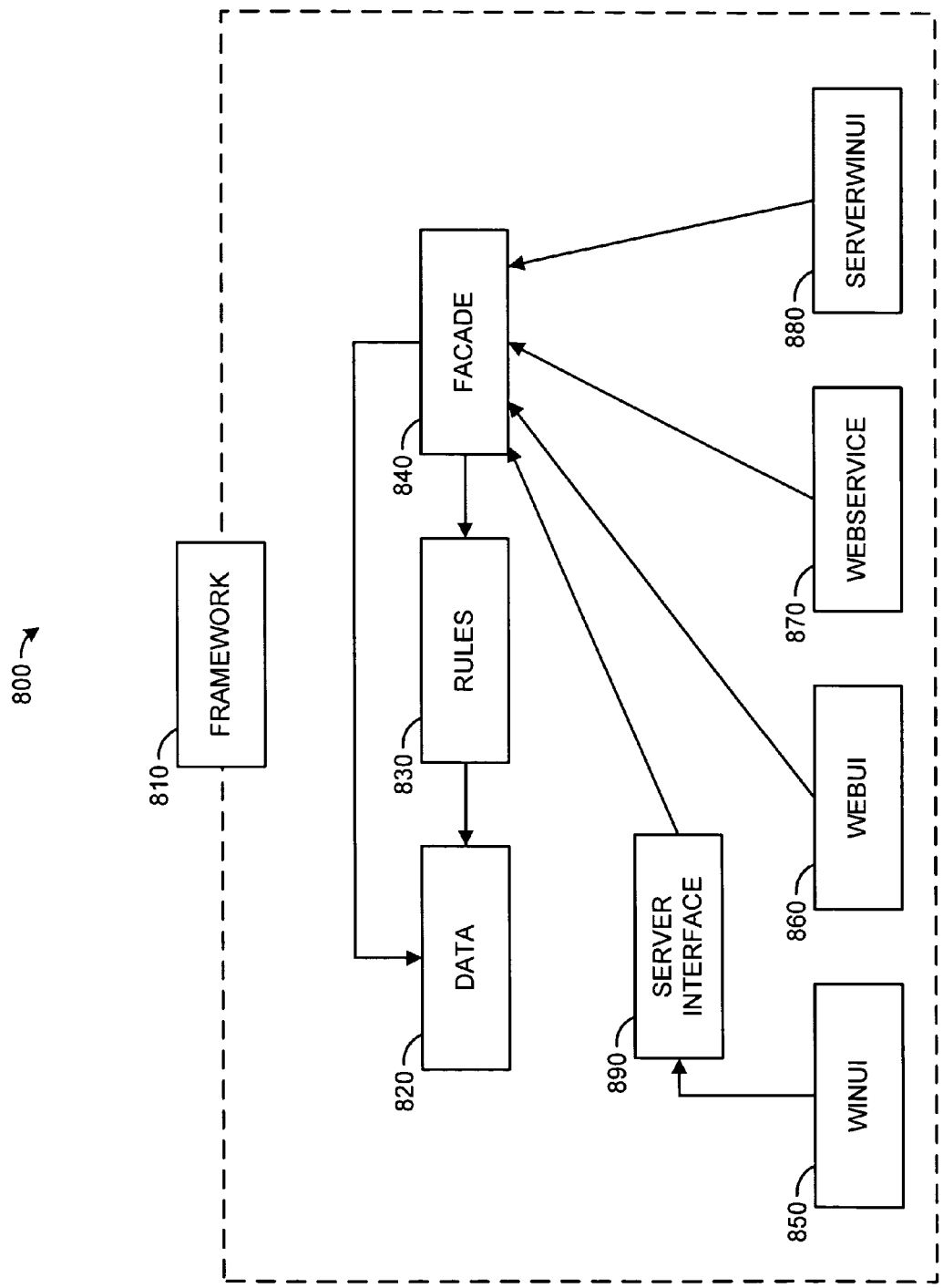
FIG. 3B is a diagram of a multi-tier hierarchy of software running on a system server in accordance with an embodiment of the present invention.

FIG. 3B is a diagram of a multi-tier hierarchy 800 of the server application 310 software running on system server 160 in accordance with an embodiment of the present invention. The bottom layer 850-880 of the hierarchy 800 is a user interface. The middle tier 820-840 is a data processing layer. Above the middle tier is a management layer 810. The user interface comprises WinUI 850, WebUI 860, WebService 870, and ServerWinUI 880. The WinUI 850 is an application which communicates to a user through Server Interface 890. The WebUI 860 is an interface for a user to access the web. The WebService 870 is a user interface created as a way for outside companies to get data. The ServerWinUI 880 is a user interface created for system server applications.

As also shown in FIG. 3B, the middle tier data processing layer comprises data 820, rules 830, and a facade 840. Data 820 is an engine configured to retrieve data for the database 370 and provide the data to different layers. Rules 830 incorporates logic, such as whether the password is correct or not. Facade 840 is an interface to bring data to the user interface. The user interface either goes through facade 840 to data 820 directly or goes through facade 840 to rules 830 to data 820 depending on whether there is logic involved or not. The top level is a framework 810 for all server applications.

Figure 4:
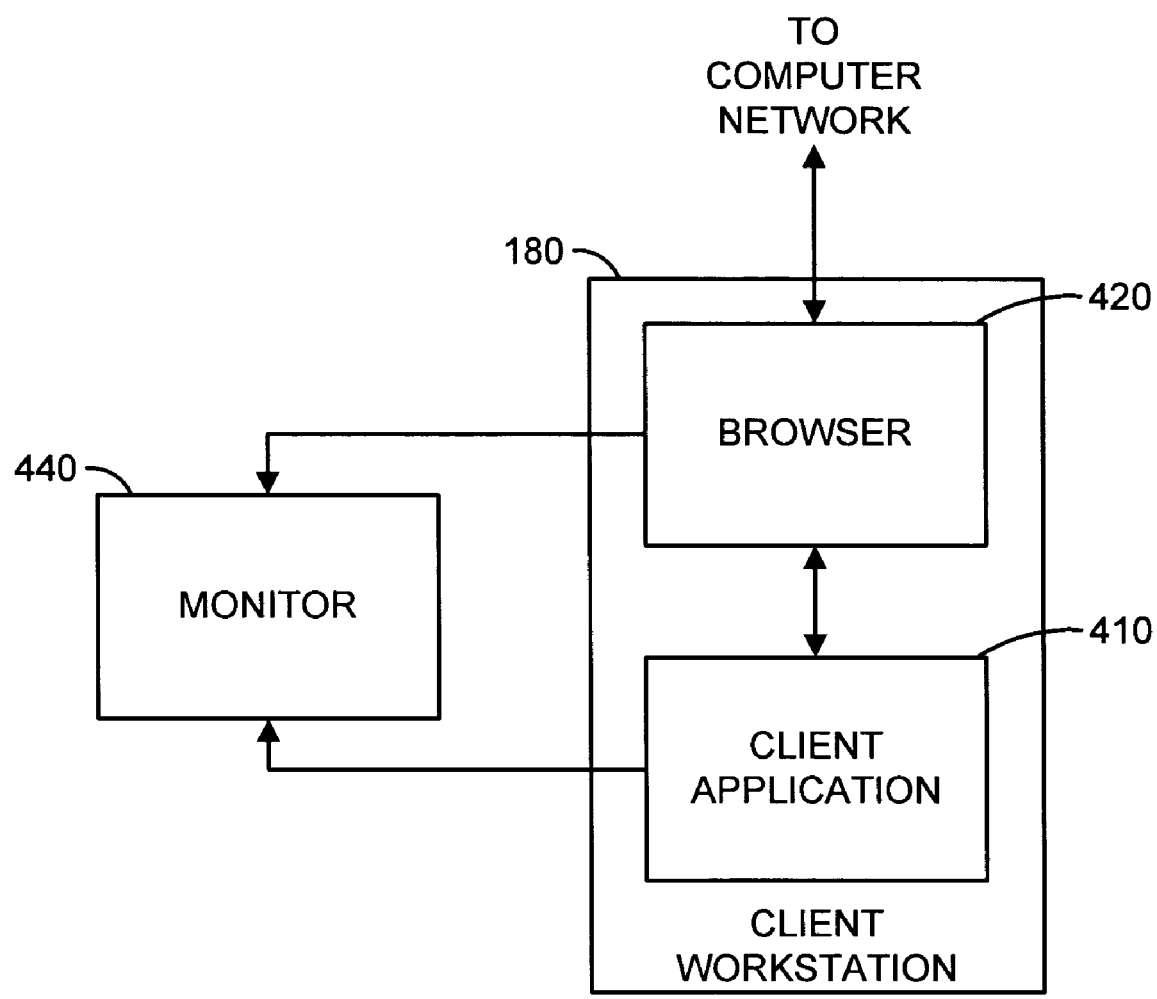
FIG. 4 is a block diagram illustrating various components of a client workstation of a caller information system in accordance with an embodiment of the present invention.

FIG. 4 is a block diagram illustrating various components of a client workstation 180 of a caller information system 100 in accordance with an embodiment of the present invention. A client application 410 running on client workstation 180 facilitates processing to be performed by client workstation 180. In various embodiments, client application 410 provides users 130 of client workstation 180 with the ability to access caller information, access administration tools of system 100, access reports relevant to system 100, and/or other functionality, as further set forth herein.

A browser 420 also running on client workstation 180 can communicate with computer network 190, permitting client workstation 180 to exchange data with system server 160. It will be appreciated that various technology known in the art can be used to facilitate communication between browser 420 and computer network 190, including DSL, telephone line, cable, and others. For example, a modem can be provided which provides communication between browser and the computer network.

Data from client application 410 and browser 420 can be displayed to a user 130 on a monitor 440 in communication with client workstation 180. Such data can include, but need not be limited to: a list of incoming calls, a call-specific card containing caller information that is displayed in response to a user selecting one of the calls in the list, and/or various reports requested by the user.

Figure 5:
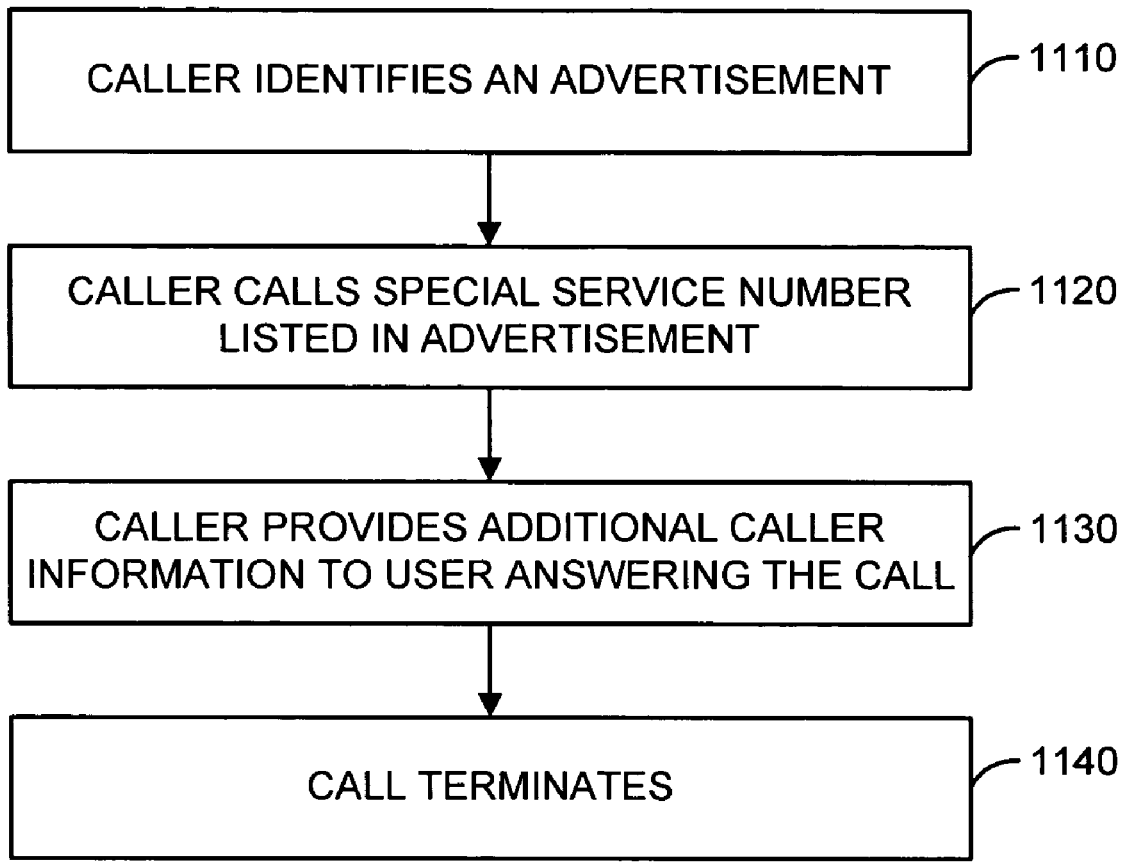
FIG. 5 is a flowchart describing a process for caller interaction with a caller information system in accordance with an embodiment of the present invention.

FIG. 5 is a flowchart describing a process for caller 110 interaction with a caller information system 100 in accordance with an embodiment of the present invention. It will be appreciated that FIG. 5 illustrates the perspective of caller 110 when interacting with system 100. At step 1110, a caller 110 identifies an advertisement 120 listed in a distributed media publication 140. Using telephone 115, the caller 110 then calls the special service number 150 listed in the advertisement 120 (step 1120). After the call is answered by user 130, the caller 110 conducts a conversation with the user 130 wherein the caller provides additional caller information to the user 130 (step 1130). For example, if the caller 110 is responding to an advertisement 120 for rental property, the caller 110 may provide details as to various features that the caller would desire in a rental property and other personal information which user 130 may ask for. As further described herein, user 130 can enter such information into client workstation 180 during and after the conversation. When the conversation between caller 110 and user 130 has finished, the call will terminate (step 1140).

Figure 6:
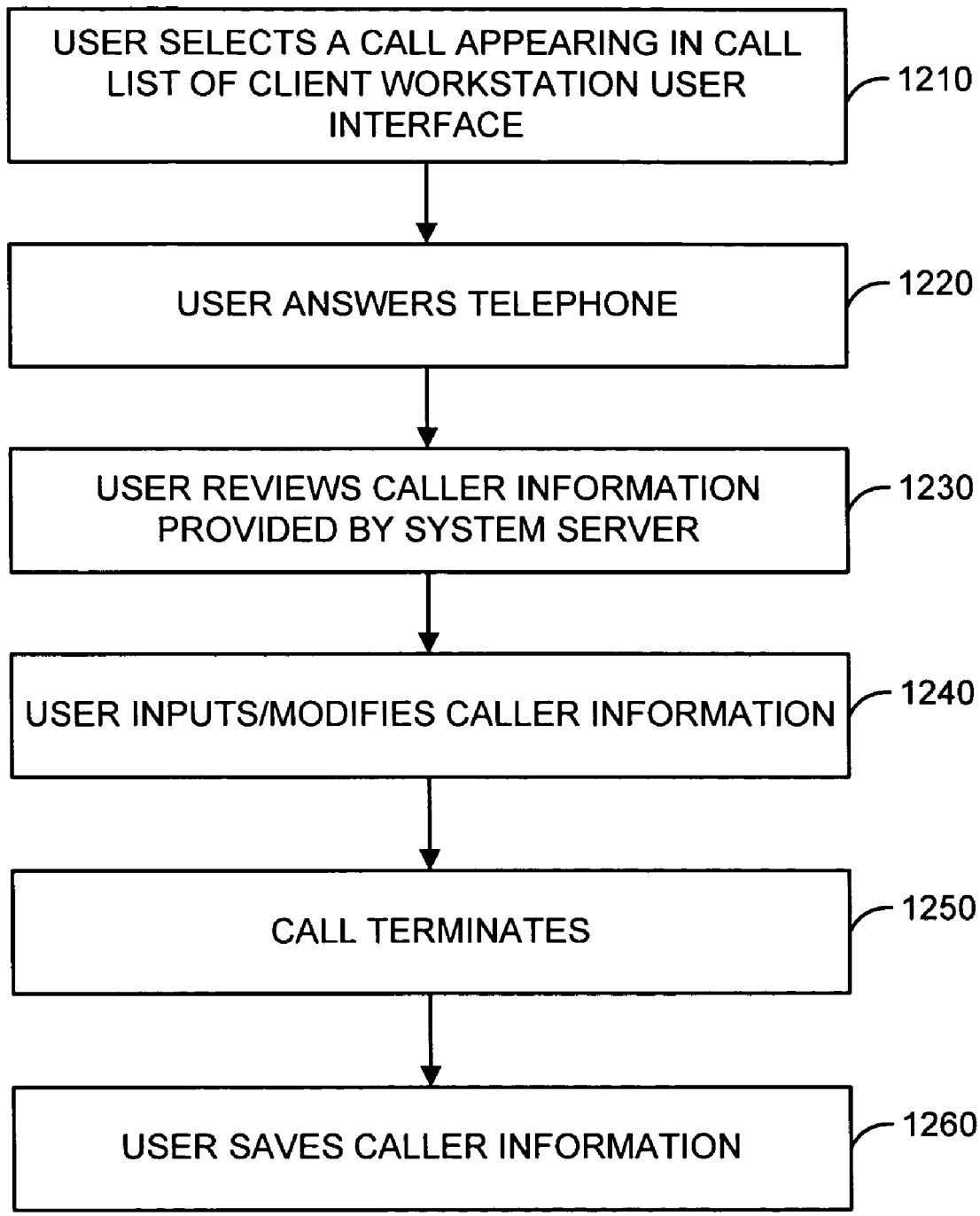
FIG. 6 is a flowchart describing a process for user interaction with a caller information system in accordance with an embodiment of the present invention.

FIG. 6 is a flowchart describing a process for user 130 interaction with a caller information system 100 in accordance with an embodiment of the present invention. It will be appreciated that FIG. 6 illustrates the perspective of user 130 when interacting with system 100. After caller information for a given telephone call has been forwarded to client workstation 180 from system server 160, the call will appear in a list of incoming calls in the user interface of client workstation 180 that is displayed on monitor 440.

Figure 7:
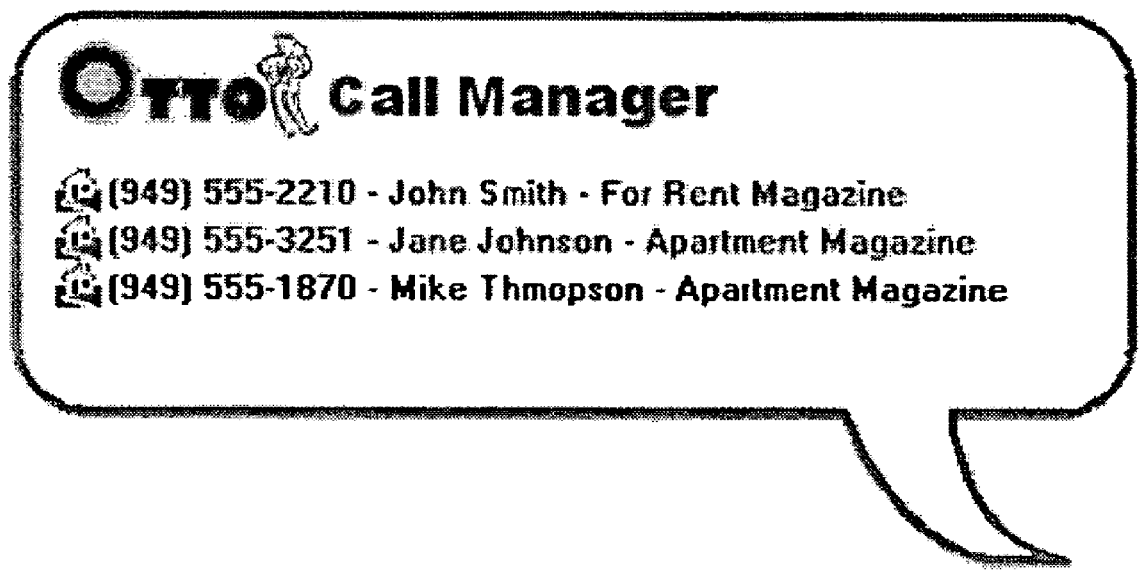
FIG. 7 illustrates a sample list of incoming calls that can be displayed on a client workstation in accordance with an embodiment of the present invention.

FIG. 7 illustrates a sample list of incoming calls that can be displayed by client workstation 180. As set forth in FIG. 7, caller information can be displayed for each incoming call, including: phone number (i.e. telephone number of caller 110, special service number 150 dialed by the caller 110, destination telephone number referenced by the special service number 150, and/or other numbers as appropriate), the name of caller 110, the distributed media 140 containing advertisement 120 and special service number 150 dialed by the caller 110, and/or other information as appropriate. In various embodiments, the list of incoming calls can be color coded to indicate the call status of each call. In one example, the following color designations can be used: black indicates an incoming call that has not yet been answered; green indicates an answered call; orange indicates a call in which the caller 110 received a busy tone; and red indicates a call that was not answered.

Referring again to FIG. 6, a user of client workstation 180 can select the incoming call (step 1210), causing the current caller information associated with the call to be displayed on monitor 440, as further described with respect to FIGS. 8A-C below. In step 1220, the user 130 answers the incoming call through user telephone 185. During the ensuing telephone conversation with caller 110, the user 130 can review the caller information that was provided by system server 160 (step 1230). The user 130 can also input additional caller information and/or modify existing information during the telephone call, thereby creating an accurate record of the telephone call and relevant information concerning caller 110 (step 1240). When the conversation between caller 110 and user 130 has finished, the call will terminate (step 1250). At step 1260, the user 130 saves the caller information.

FIGS. 8A-C illustrate several examples of card templates that can be used to display caller information to user 130 on workstation 180. Such templates provide a convenient and familiar way for user 130 to interact with caller information in a format that is easy to read, modify, and update. In various embodiments, system 100 can provide user 130 with functionality for sending such templates and/or any desired caller information to other users 130, client workstations 180, offices 187, and/or other destinations by email and/or through other communication methods known in the art.

It will be appreciated that the templates of FIGS. 8A-C are provided for purposes of example, and that other templates, including user-configurable and industry-specific templates are further contemplated by the present invention. In various embodiments, the templates can provide fixed, variable, and manual input fields. The fixed fields can include caller information that is extracted and automatically calculated during a call, such as the special service number dialed, the date and the time of the call, and the duration of the call. The variable fields can contain the caller's name, number, and, if available from a white pages search, the address, and the name of the person taking the call. The manual input fields can enable the user 130 to enter pertinent and personal information about the caller 130 during and/or after the telephone call.

As shown in FIGS. 8A-B, a guest card template 500 has a front card 501 and a back card 502 that provide information in a format useful for recording caller information for the multi-housing industry, or other guest-related industries, such as the automotive, leasing, real estate, and property management industries. The back page 502 allows further documenting of the history of previous calls placed by the caller 130. The front 501 and back 502 cards have fixed 510, variable 520, and manual input 530 fields, as described above. The manual input fields 530 can include an e-mail address 531, a notes category 532, apartment requirements and home needs 533, marketing feedback 534, apartment shown information 535, and rental feedback 536. The e-mail address 531 is linked to the user's 130 computer e-mail service to conveniently allow the user 130 to send preset text as email to the caller 110 by clicking an email button 540, assuming a valid email address is entered. The preset text can use the first name and last name fields to make it more personalized and may automatically link to the back page rental feedback 536. The notes 532 provide an on-going log that helps the user 130 develop and maintain a relationship with the caller 110. The rental feedback 536 allows the user 130 to review the move-in date criteria or the reason why the caller 110 is not leasing by retrieving the guest card from the system 100.

As shown in FIG. 8C, a service request template 600 provides information in a format useful for organizations with extensive maintenance, repair, and installation functions. The manual input fields may, for example, identify the location of a repair, a repair type (e.g. bathroom plumbing), a priority class (e.g. emergency), history of the apartment and/or tenant, the service request needed, and maintenance appointments dates and time. The e-mail field notifies tenants when work begins and is completed and provides a satisfaction survey after completion of the work. Other fields include special tenant instructions and access permissions for service and management personnel, and an optional staff paging selection which notifies personnel of emergencies and/or new work orders.

Figure 9:
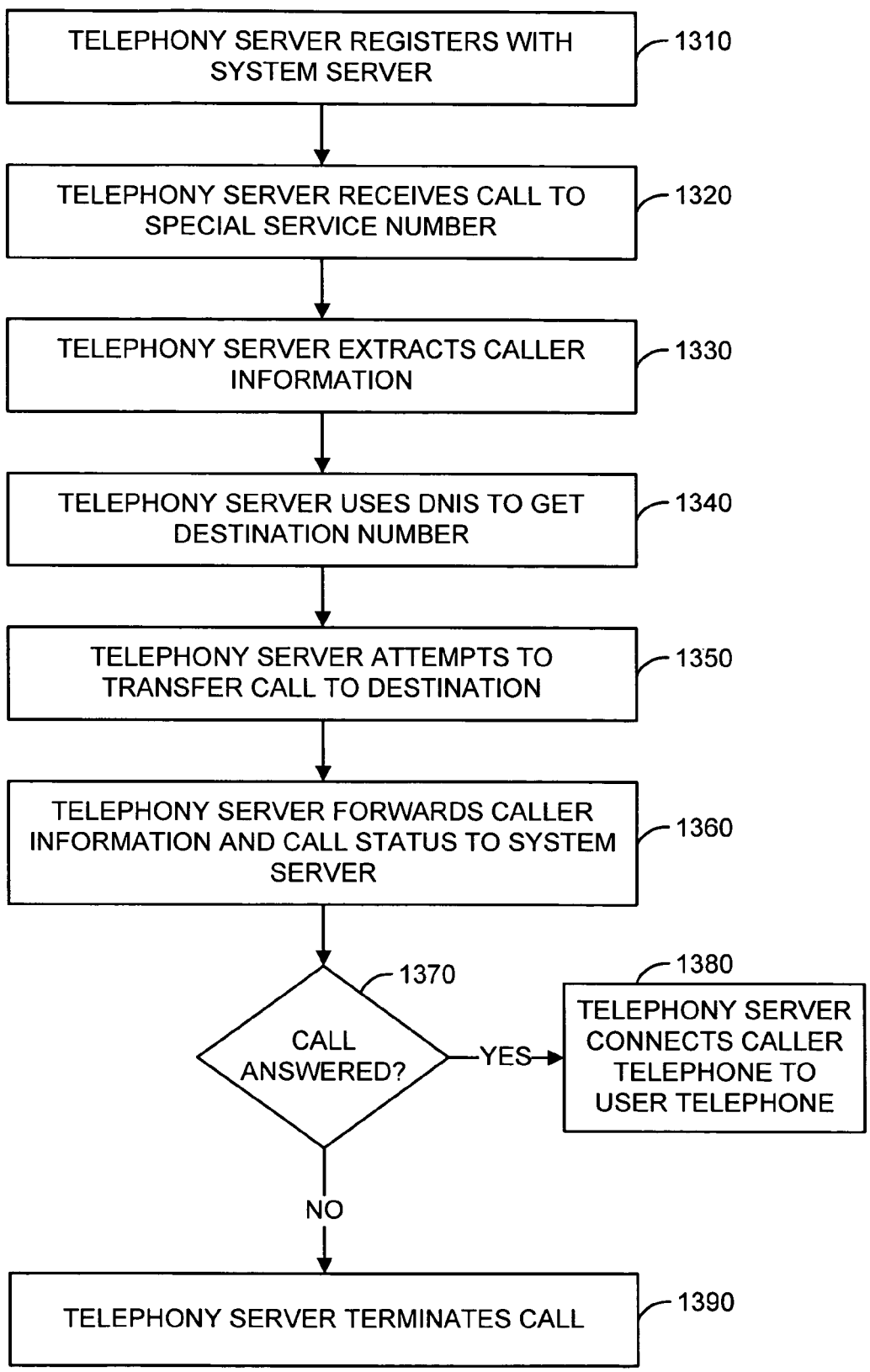
FIG. 9 is a flowchart describing a process performed by a telephony server in accordance with an embodiment of the present invention.

FIG. 9 is a flowchart describing a process performed by a telephony server in accordance with an embodiment of the present invention. When telephony server 170 is launched, it registers itself with system server 160 (step 1310). Such registration can be achieved by passing a ServerID to system server 160. System server 160 then validates the ServerID received from telephony server 170 by comparing the ServerID with data stored on database 370. If the ServerID is found to be valid, then system server 160 informs the telephony server 170 that a successful registration has been performed.

At step 1320, telephony server 170 receives an incoming telephone call from caller 110 directed toward a special service number 150. It will be appreciated that step 1320 can occur in response to step 1120 of FIG. 5. Telephony server 170 then extracts certain caller information from the incoming telephone call, including ANI information and DNIS information (step 1330). In step 1340, telephony server 170 uses the DNIS information to get a destination number to which the call should be transferred. Telephony server 170 then attempts to transfer the call to the destination number (step 1350).

In step 1360, telephony server 170 forwards the extracted caller information to system server 160 and the call status. The call status identifies the present disposition of the telephone call, and may be configured to indicate: new incoming call, call answered, call busy, call not answered, call terminated because busy, and premature call termination. The caller information can be forwarded to system server 160 in any suitable manner, such as through a COM interop to a .NET DLL, a standalone .NET DLL, or a WebService. The data can be passed in the form of a TelephonyCaller object and received by the client DLL of system server 160. Additional information may also be passed, including the destination number associated with the special service number 150 and/or a SessionID associated with the particular telephone call.

If the call is answered by user 130 at user telephone 185 (step 1370), then telephony server 170 connects caller telephone 115 to user telephone 185 (step 1380). Otherwise, telephony server 170 terminates the call (step 1390).

Figure 10:
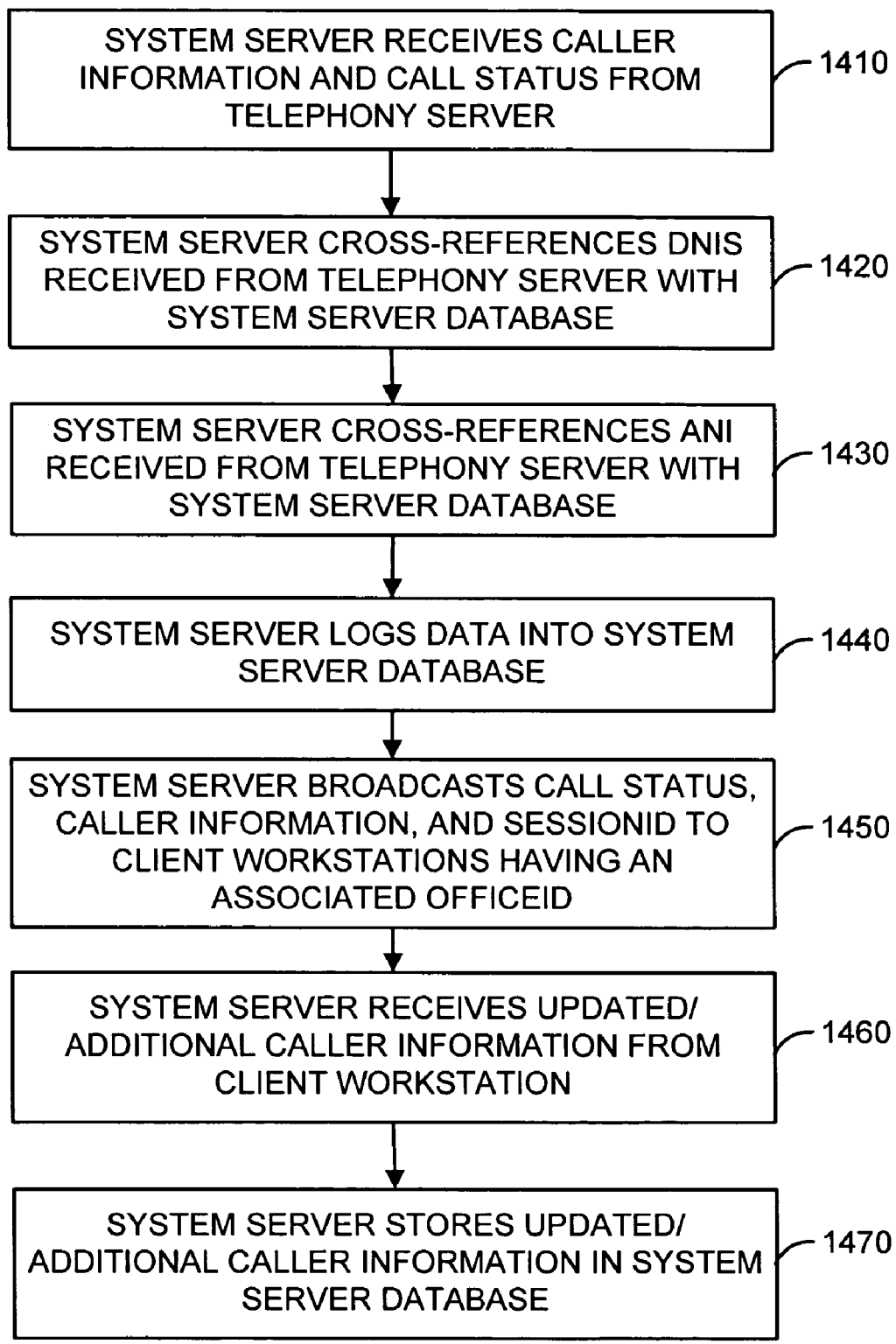
FIG. 10 is a flowchart describing a process performed by a system server in accordance with an embodiment of the present invention.

FIG. 10 is a flowchart describing a process performed by system server 160 in accordance with an embodiment of the present invention. At step 1410, system server 160 receives caller information and the call status from telephony server 170. It will be appreciated that step 1410 can occur in response to step 1360 of FIG. 9. In various embodiments, a TelephonyCaller object can be received in step 1410. Upon receipt of such a TelephonyCaller object, system server 160 can create a Caller object which inherits the TelephonyCaller object.

At step 1420, system server 160 then cross-references the DNIS received as part of the caller information with the system server database 370 to obtain: an OfficeID associated with the destination number, a CallerID reference associated with the particular caller 130, a CardType, and an IconName. System server 160 also cross-references the ANI received as part of the caller information with the system server database 370 to retrieve previous caller information associated with the caller 110/walk-in customer 111 or the caller's 110/walk-in customer's 111 telephone number (step 1430). In various embodiments, such information can include: the caller's 110 personal information (i.e. first name, last name, etc.) and/or any previously stored caller information. In various embodiments, as a result of cross-referencing steps 1420 and 1430, the following information can be incorporated into the Caller object: CallerID, CardType, IconName, FirstName, and LastName.

At step 1440, system server 160 logs appropriate caller information and/or other data into system server database 370. In certain embodiments, the following can be logged: OfficeID, SessionID, ANI, DNIS, destination number, and call status.

At step 1450, system server 160 broadcasts the caller information and SessionID to all client workstations 180 associated with the OfficeID retrieved by system server 160. In various embodiments, this can be achieved by system server 160 passing an EventMessage object which includes a MessageObject (which includes a Caller object) and a MessageType (which includes a CallerMessage). It is contemplated that various MessageTypes can be employed to provide flexibility in the information passed from the system server 160 to the client workstation 180. For example, in addition to the CallerMessage, the MessageType may also provide for a News object, thereby permitting the system server 160 to pass news items to client workstation 180.

In various embodiments, the EventMessage can be sent using .NET remoting technology. When .NET remoting is used, the system server 160 looks up all client workstations 180 that are logged in and finds the .NET remoting references to those client workstations 180. The system server 160 then invokes a method on each client workstation 180 (using the .NET remoting reference for each client workstation 180) and passes a message as a parameter to the invoked method.

At step 1460, system server 160 receives updated and/or additional caller information from client workstation 180. It will be appreciated that step 1460 can occur in response to step 1240 of FIG. 6. In step 1470, the system server 160 stores the updated and/or additional caller information in system server database 370.

Figure 11:
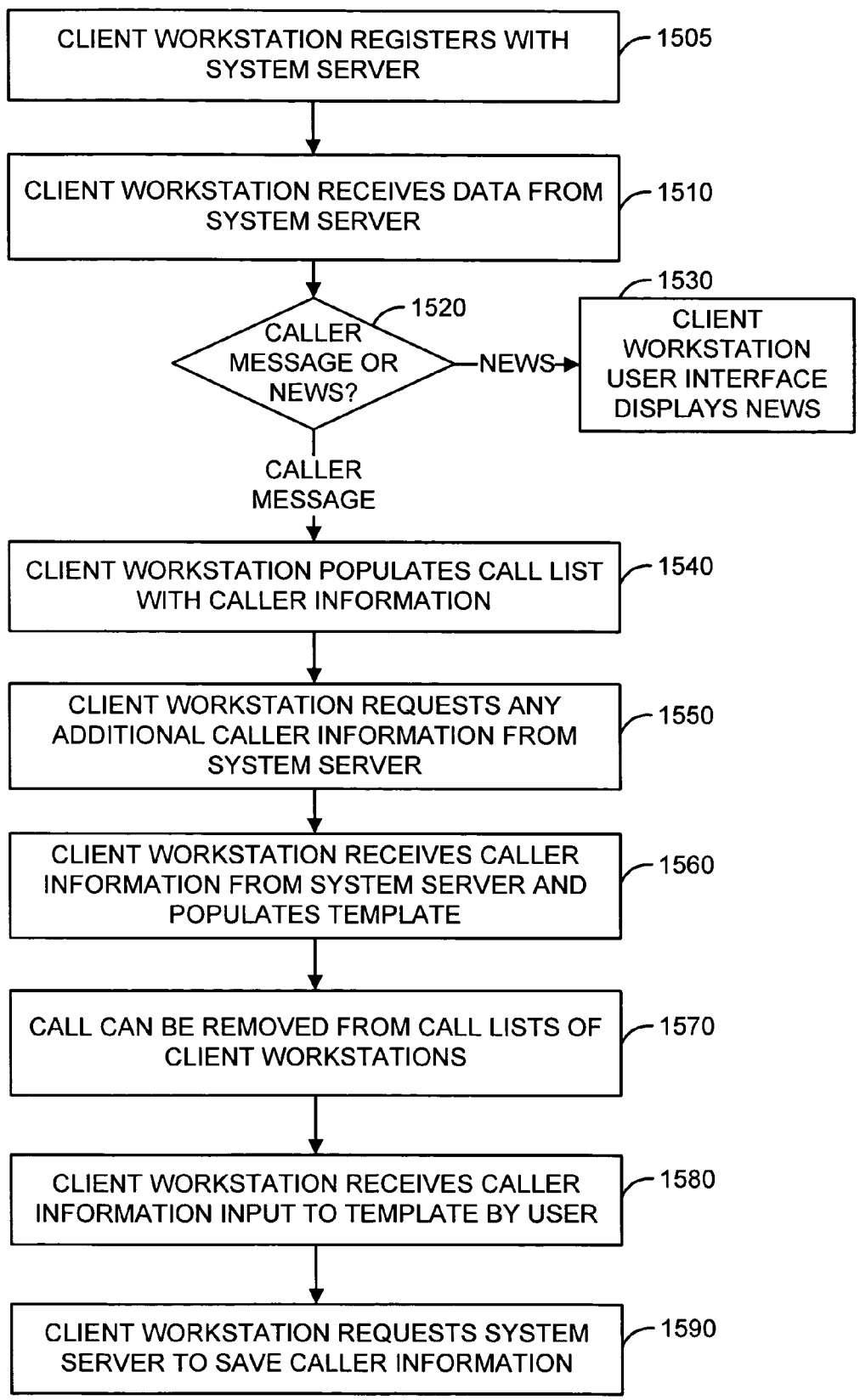
FIG. 11 is a flowchart describing a process performed by a client workstation in accordance with an embodiment of the present invention.

FIG. 11 is a flowchart describing a process performed by a client workstation 180 in accordance with an embodiment of the present invention. As an initial step, client workstation 180 registers with system server 160 (step 1505). If this is the first time that client application 410 of client workstation 180 has been launched, then client workstation 180 connects to system server 160 using .NET remoting and passes a username and password associated with office 187 to a workstation registration method to be performed by system server 160. Upon a successful validation of the username and password, system server 160 passes back an OfficeID to be stored in the registry of client workstation 180, thereby stamping client workstation 180 as a licensed client of system 100.

Upon subsequent launches of client application 410, registration can be achieved by passing to system server 160 the OfficeID assigned to the office 187 in which client workstation 180 is situated. The system server 160 checks database 370 to determine the number of licenses associated with the OfficeID. If no licenses are available, then system server 160 prompts the client workstation 180 that all available licenses have been used and/or that additional licenses must be purchased. However, if a license is available, then system server 160 registers the client workstation 180 and passes back a unique ClientID to client workstation 180. Once a successful registration is established between client workstation 180 and system server 160, the client workstation 180 can remotely instantiate any publicly available object on the system server 160 and use its methods.

At step 1510, client workstation 180 receives data from system server 160. It will be appreciated that step 1510 can occur in response to step 1450 of FIG. 10. In various embodiments, step 1510 can cause a method to be invoked on client workstation 180, with the data passed as a parameter of the invoked method.

In response to the data received in step 1510, client workstation 180 displays an appropriate user interface on monitor 440 to properly display the data (step 1520). If a News object is received, then the client workstation 180 displays the news information included in the News object (step 1530). If a Caller message is received (including caller information), then client application 410 of client workstation 180 raises an event to the user interface layer which in turn populates an entry in a call list with caller information included in the Caller message (step 1540).

As explained above, a user 130 can select a call appearing in the call list (step 1210 of FIG. 6; see also the screen shot of FIG. 8). In response to such a step, the client workstation 180 requests any additional caller information associated with caller 130 from system server 160 (step 1550). In various embodiments, step 1550 can be achieved by client application 410 calling a method using .NET remoting. Client workstation 180 receives the requested caller information from system server 160 and automatically populates an appropriate template (for example, a guest card or a service card as illustrated in FIGS. 8A-C) with the caller information (step 1560). It will be appreciated that the populated template provides a convenient way for user 130 to view relevant caller information during a telephone call (see step 1230 of FIG. 6). The entry for the selected call can be removed from all call lists of all client workstations 180 having the OfficeID corresponding to the call (step 1570). From the discussion above with respect to FIG. 7, it will be appreciated that, in various embodiments, the entry for the selected call can remain in the call list with its call status indicated by the list.

At step 1580, client workstation 180 receives caller information input to the template by the user 130 operating the client workstation 180. It will be appreciated that step 1580 can occur in response to step 1240 of FIG. 6. Client workstation 180 then requests system server 160 to save the caller information in database 370 (step 1590). This can be achieved by the client application 410 calling a method on system server 160 using remoting technology, and passing the template containing the caller information to system server 160. It will be appreciated that step 1590 can occur in response to step 1260 of FIG. 6. In various embodiments, an EmployeeID associated with user 130 can be saved with the caller information.

It will be understood that the functionality (including but not limited to the performance of the various steps described herein) provided by system 100 and user 130 in relation to caller 110 can also be provided in relation to walk-in customer 111, where relevant. For example, upon meeting with a walk-in customer 111, a user 130 may enter certain caller information pertaining to the walk-in customer 111 (i.e. the customer's name) into client workstation 180 through an appropriate template (i.e. a blank guest card, blank service card, or other template). The caller information can be forwarded by client workstation 180 to system server 160 which cross-references the caller information with database 370 to obtain previously entered caller information pertaining to the walk-in customer 111. The system server 160 can forward such cross-referenced information back to client workstation 180. Client workstation can automatically populate the template with the cross-referenced caller information for display to the user 130. As a result, the user 130 can be provided with any caller information previously stored by system 100 pertaining to walk-in customer 111, regardless of whether such caller information was obtained from the walk-in customer 111 in person, or from a call placed by a caller 110.

Figure 12A:
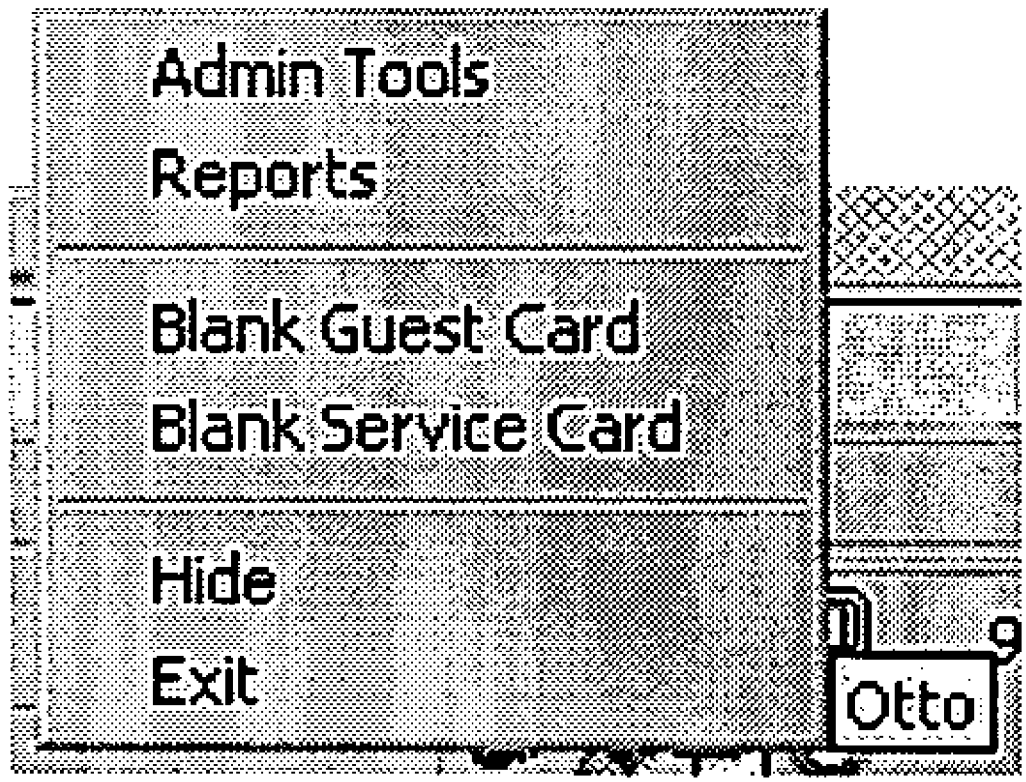

FIG. 12A provides a screenshot of a menu that can be displayed to user 130 of client workstation 180, in accordance with an embodiment of the present invention. It will be appreciated that such a menu can be configured to appear in response to user 130 performing a right mouse click on an icon associated with client application 410 in the "system tray" of an applicable Windows-based operating system. The particular menu items displayed to user 130 can be obtained by client workstation 180 requesting the menu items from system server 160, system server 160 retrieving the items from database 370, and system server 160 returning the retrieved items to client workstation 180.

As illustrated in the example of FIG. 12A, the menu can provide the following items: "Admin Tools," "Reports," "Blank Guest Card," "Blank Service Card," "Hide," and "Exit." If user 130 selects "Hide," then the menu will disappear, and the client application 410 will continue to run on client workstation 180, indicated by an icon remaining in the system tray. If user 130 selects "Exit," then the client workstation 180 prompts the user 130 as to whether the user 130 wants to close the client application 410 and takes appropriate action to either close client application 410 or allow it to continue to run on client workstation 180 depending on the user's 130 response.

If user 130 selects the "Blank Guest Card" or "Blank Service Card" items, then client workstation 180 will display an appropriate blank guest card or blank service card to user 130. The user 130 can enter caller information into the blank card and then save the caller information to system server 160 in accordance with steps 1580 and 1590 of FIG. 11 previously described herein.

If user 130 selects "Admin Tools" or "Reports," and the user 130 is an administrator, then the user 130 can access functionality for generating reports and implementing administrative tools. In various embodiments, such functionality can be provided through a browser-based interface displayed by client workstation 180 and/or a browser-based interface displayed on any other appropriate computing device 197 in communication with system server 160 over computer network 190.

Figure 12B:
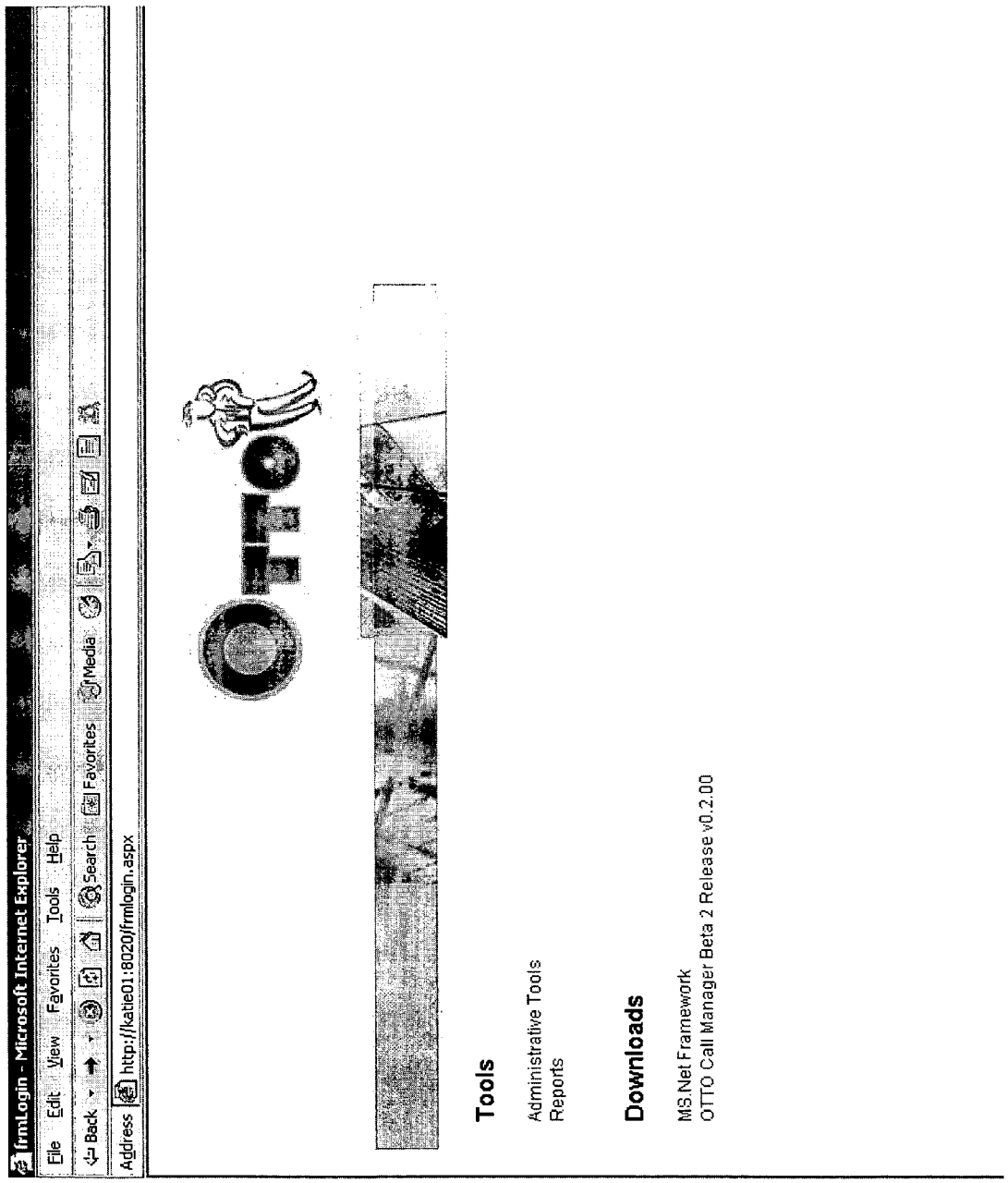
Figure 12C:
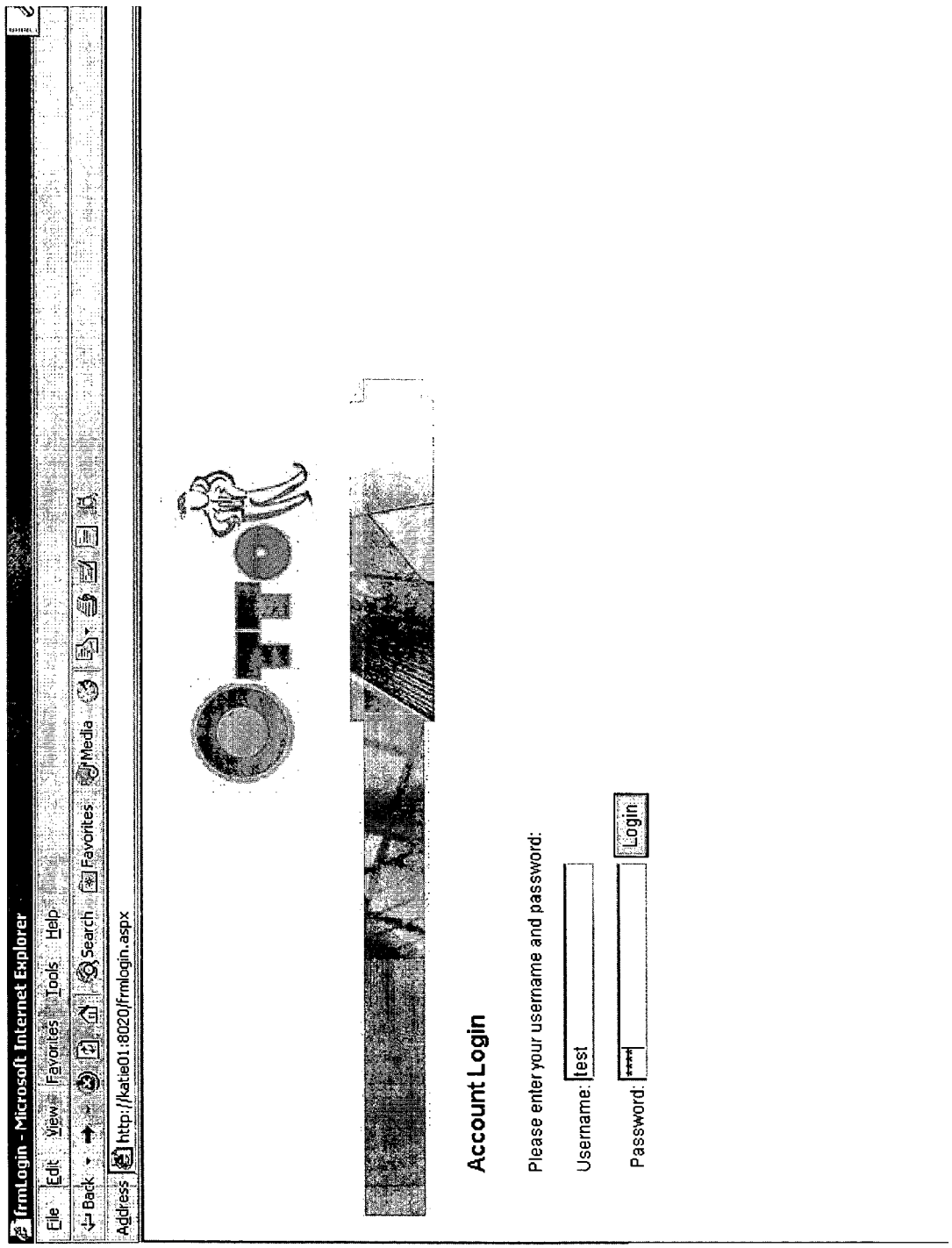

FIG. 12B provides a screenshot of a browser-based menu screen displaying a webpage with options for generating reports and accessing administrative tools, in accordance with an embodiment of the present invention. In various embodiments, the webpage of FIG. 12B can be accessed by logging in to a website using a browser-based interface of any appropriate computing device 197 that is communication with system server 160 over computer network 190. FIG. 12C provides a screenshot of a browser-based login screen that can be used in such embodiments.

Figure 12D:
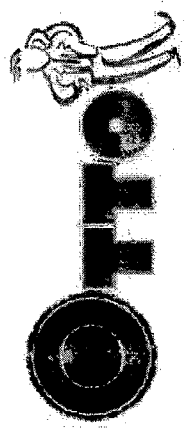

FIG. 12D provides a screenshot of a webpage with various administration tools that can be accessed by an administrator, in accordance with an embodiment of the present invention. It will be appreciated that the webpage of FIG. 12D can be accessed by an administrator clicking on the "Administrative Tools" link displayed in FIG. 12B. Alternatively, the screen of FIG. 12D can be accessed by selecting "Admin Tools" in the menu of FIG. 12A.

As illustrated in FIG. 12D, the webpage provides an interface for viewing advertising source information (for use, for example, in advertising campaigns) which includes the associations between special service numbers 150 (i.e. phone numbers) and distributed media 140 (i.e. sources) used by an advertiser, as well as the type of card template to be used by client workstation 180 for displaying caller information when responding to the various phone numbers. The webpage further provides an interface for viewing, adding, and removing different users 130 (i.e. office representatives) associated with a given office 187. In other embodiments, an appropriate interface can be provided for accessing various questions and answers (not shown) to provide user 130 with information helpful to the user's 130 interaction with system 100. For example, such questions and answers could be provided to aid the user 130 in filling out a guest card template, or other template used by system 100.

Figure 13:
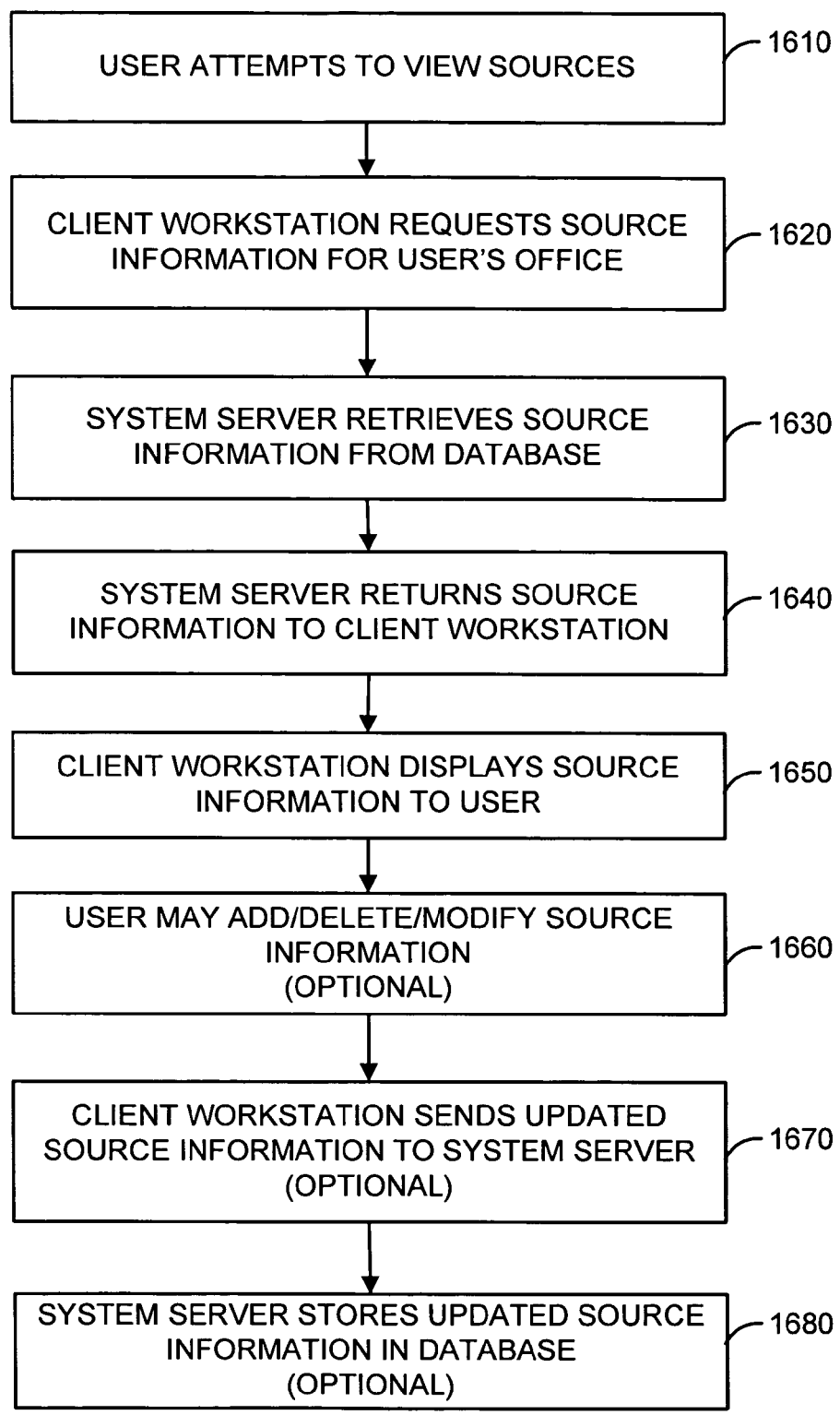
FIG. 13 is a flowchart describing a process for viewing and/or modifying advertising source information in accordance with an embodiment of the present invention.

FIG. 13 describes the interaction between user 130, client workstation 180, and system server 160 for viewing and/or modifying advertising source information in accordance with an embodiment of the present invention. At step 1610, a user 130 having administrative privileges (i.e. a user who is also an administrator) attempts to view the advertising sources that are used by an advertiser's office 187. Step 1610 can be performed, for example, by user 130 attempting to access the web page illustrated in FIG. 12D through client workstation 180. In response, client workstation 180 requests the advertising source information from system server 160 (step 1620). To identify the appropriate office 187, the client workstation 180 can also pass the OfficeID associated with office 187 during step 1620.

At step 1630, the system server 160 retrieves the source information associated with the office 187 from database 370. The source information is returned to client workstation 180 (step 1640) where it is displayed to user 130 (step 1650). In various embodiments, the source information can be displayed in HTML format (as illustrated in FIG. 12D), pdf format, or any appropriate format known in the art.

The user 130 can optionally add, delete, and/or modify the source information if provided for in the user interface displayed by client workstation 180 (step 1660). If the source information is changed, then client workstation 180 sends the updated source information to system server 160 (step 1670), and system server 160 stores the updated source information in database 370 (step 1680).

Although the steps of FIG. 13 have been described in relation to a user 130 interacting with client workstation 180, it will be appreciated that computing device 197 can also be used in place of client workstation 180 for performing the appropriate steps.

Figure 14:
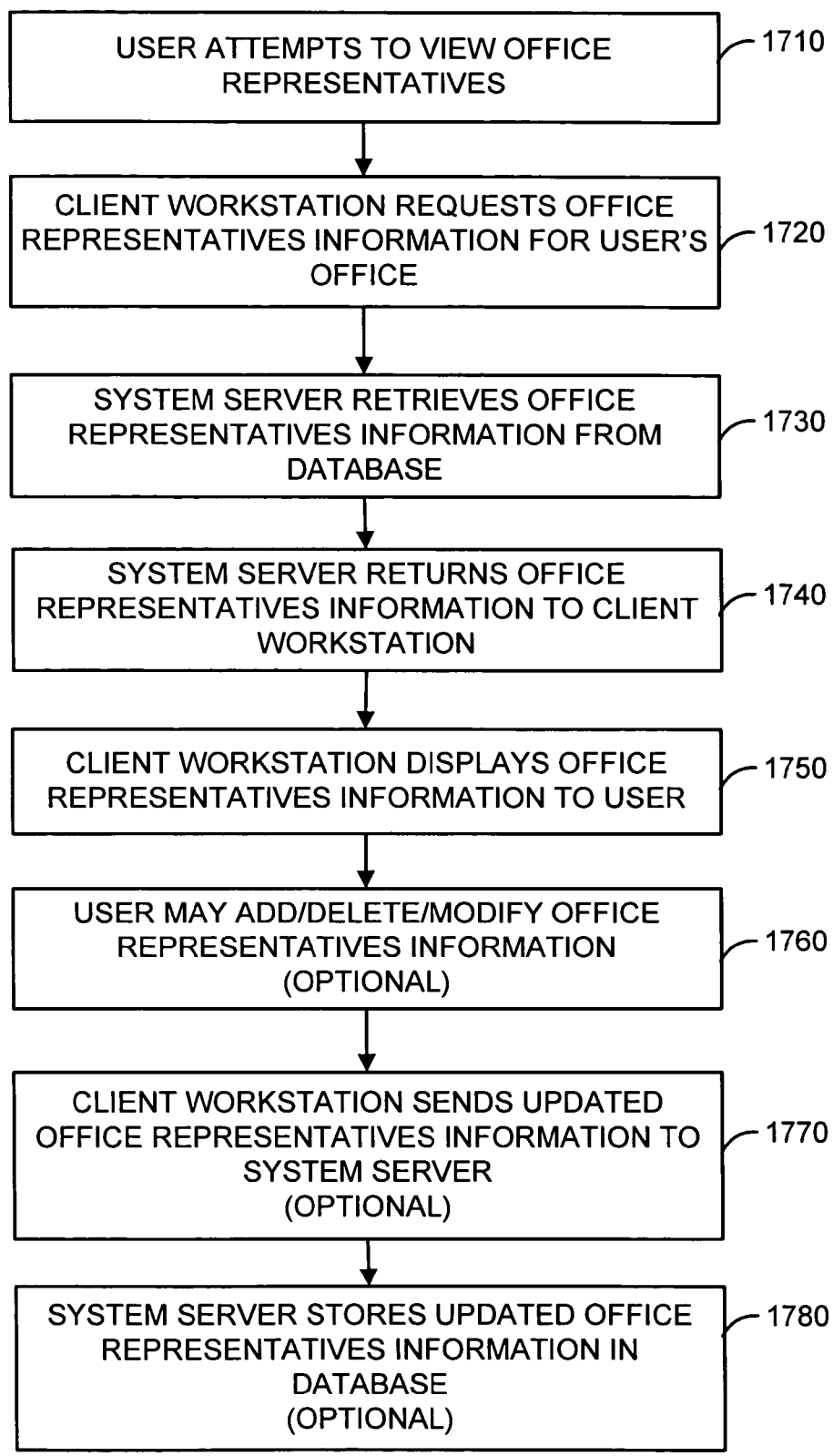
FIG. 14 is a flowchart describing a process for viewing and/or modifying office representatives information in accordance with an embodiment of the present invention.

FIG. 14 describes the interaction between user 130, client workstation 180, and system server 160 for viewing and/or modifying office representatives information in accordance with an embodiment of the present invention. At step 1710, a user 130 having administrative privileges attempts to view the office representatives (i.e. users 130) that are associated with an advertiser's office 187. For example, the user 130 may attempt to access the web page illustrated in FIG. 12D through client workstation 180. In response, client workstation 180 requests the office representatives information from system server 160 (step 1720). To identify the appropriate office 187, the client workstation 180 can also pass the OfficeID associated with office 187 during step 1720.

At step 1730, the system server 160 retrieves the office representatives information associated with the office 187 from database 370. The office representatives information is returned to client workstation 180 (step 1740) where it is displayed to user 130 (step 1750). In various embodiments, the office representatives information can be displayed in HTML format (as illustrated in FIG. 12D), pdf format, or any appropriate format known in the art.

The user 130 can optionally add, delete, and/or modify the office representatives information if provided for in the user interface displayed by client workstation 180 (step 1760). It will be appreciated that such functionality is provided in the interface illustrated in FIG. 12D. If the office representatives information is changed, then client workstation 180 sends the updated office representatives information to system server 160 (step 1770), and system server 160 stores the updated office representatives information in database 370 (step 1780).

Although the steps of FIG. 14 have been described in relation to a user 130 interacting with client workstation 180, it will be appreciated that computing device 197 can also be used in place of client workstation 180 for performing the appropriate steps.

FIG. 12E provides a screenshot of a browser-based menu screen that can be displayed to user 130 on client workstation 180 for selecting records and reports, in accordance with an embodiment of the present invention. It will be appreciated that the webpage of FIG. 12E can be accessed by an administrator clicking on the "Reports" link displayed in FIG. 12B. Alternatively, the screen of FIG. 12E can be accessed by selecting "Reports" in the menu of FIG. 12A. As illustrated by the examples for an apartment leasing office set forth in FIG. 12E, a wide variety of records and reports can be made available for viewing. It will be appreciated that the various available records and reports provide convenient ways to view the caller information stored in database 370.

Figure 15:
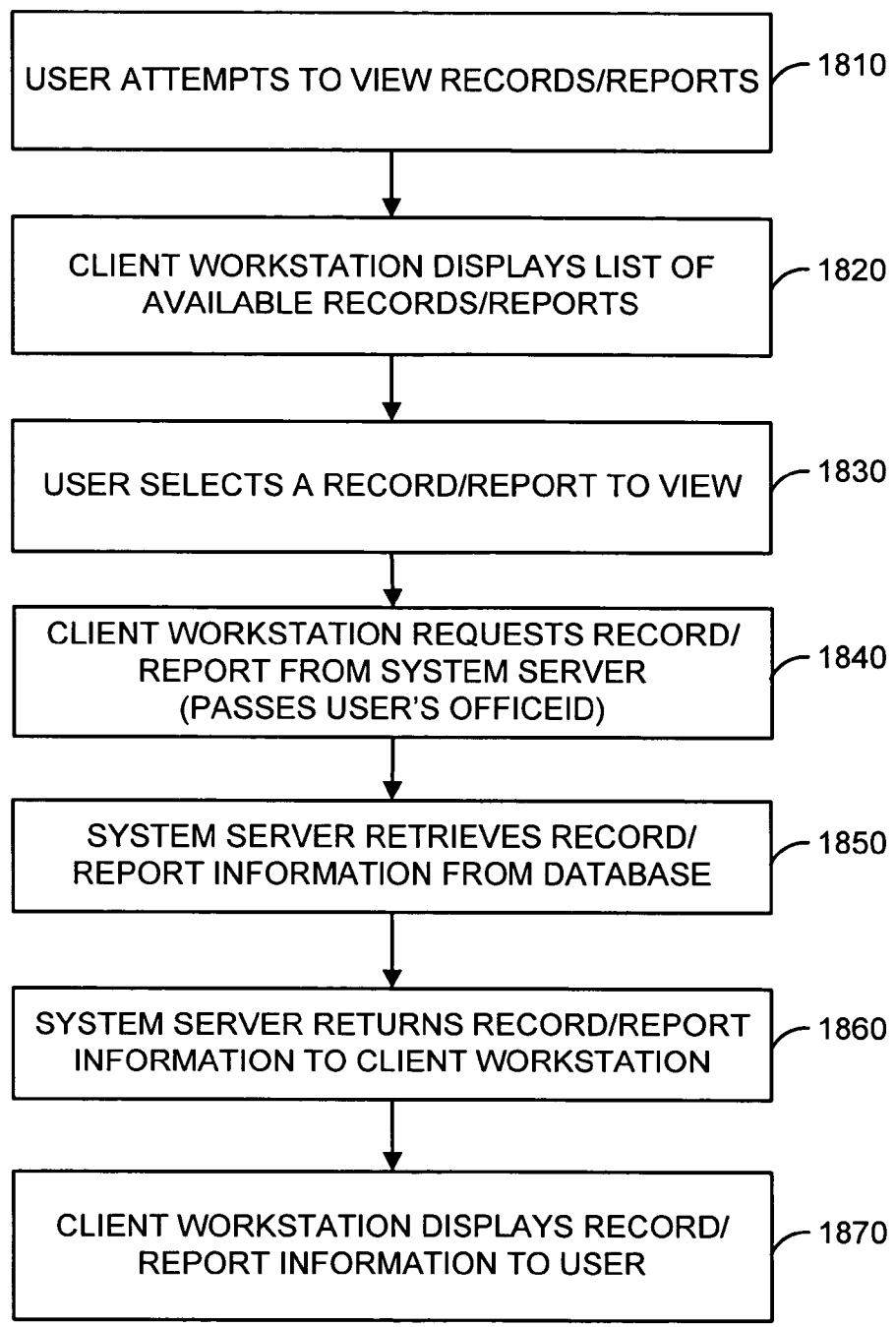
FIG. 15 is a flowchart describing a process for viewing records and reports in accordance with an embodiment of the present invention.

FIG. 15 describes the interaction between user 130, client workstation 180, and system server 160 for viewing records and reports in accordance with an embodiment of the present invention. At step 1810, a user 130 having administrative privileges attempts to view records or reports concerning data that has been stored by system 100. For example, the user 130 may attempt to access the web page illustrated in FIG. 12E through client workstation 180. As a result, client workstation 180 displays a list of records/reports that are available for viewing (step 1820). The user 130 can then select one of the records/reports in the list (step 1830). In response, client workstation 180 requests the selected record/report from system server 160 (step 1840). To identify the appropriate office 187, the client workstation 180 can also pass the OfficeID associated with office 187 during step 1840.

At step 1850, the system server 160 retrieves the appropriate record/report information associated with the office 187 from database 370, generating the appropriate record/report from information in database 370 as necessary. The source information is returned to client workstation 180 (step 1860) where it is displayed to user 130 (step 1870). In various embodiments, the source information can be displayed in HTML format, pdf format, or any appropriate format known in the art.

Although the steps of FIG. 15 have been described in relation to a user 130 interacting with client workstation 180, it will be appreciated that computing device 197 can also be used in place of client workstation 180 for performing the appropriate steps.

In another aspect of the present invention, monitoring functionality can be provided by system 100 to permit a developer to monitor the performance and operation of system 100. For example, functionality can be provided for: viewing data pertaining to all client workstations 180 currently online, creating reports on activities and connections to system server 160, and/or viewing a live transaction feed from system server 160 for all activities between client workstation 180 and system server 160, and between telephony server 170 and system server 160. Such functions can be accessed by a developer through computing device 197.

Figure 16:
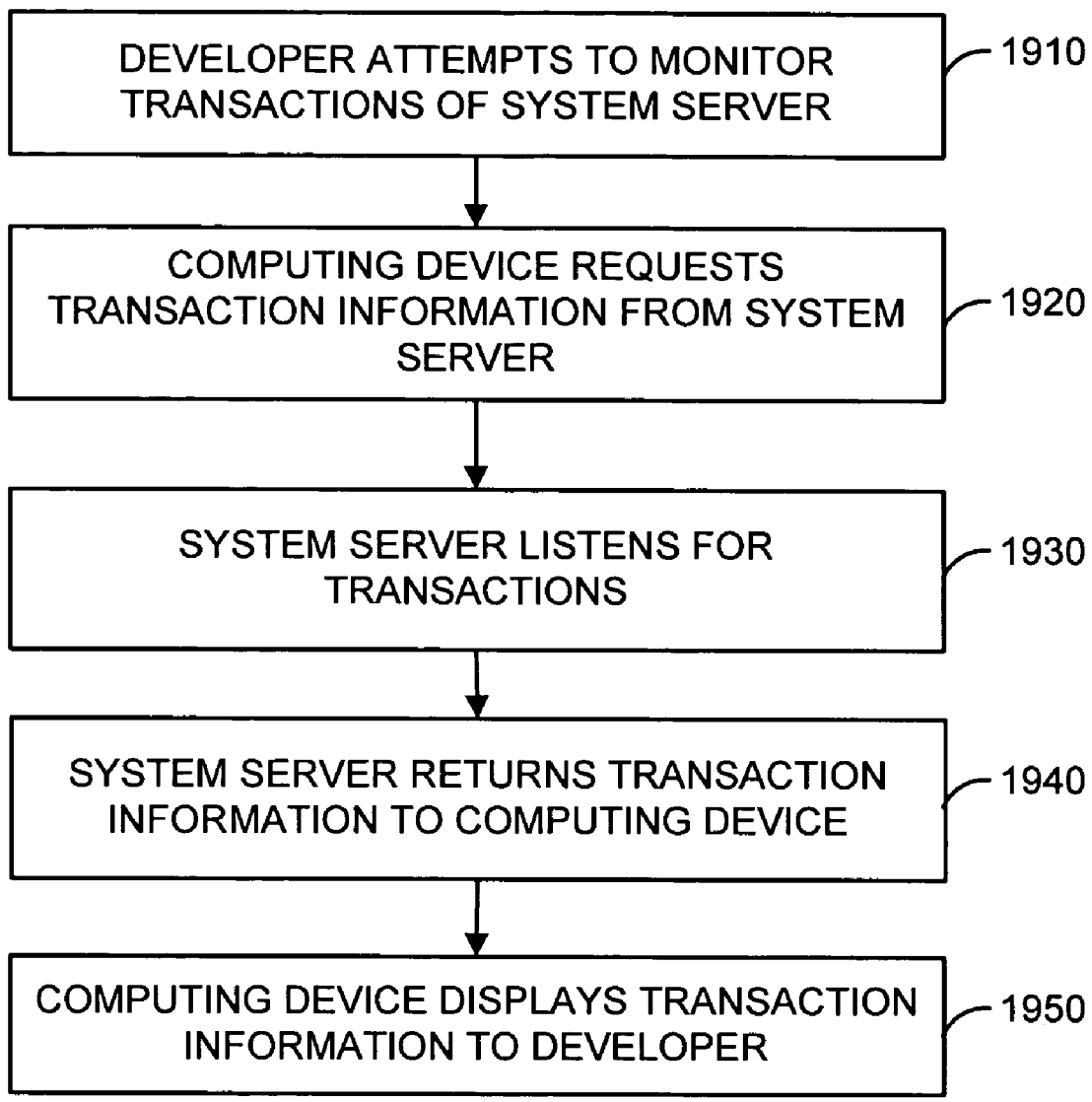
FIG. 16 is a flowchart describing a process for monitoring transactions performed by a system server in accordance with an embodiment of the present invention.

FIG. 16 describes the interaction between computing device 197 and system server 160 for monitoring transactions performed by system server 160 in accordance with an embodiment of the present invention. At step 1910, a developer attempts to monitor the transactions performed by system server 160. As a result, computing device 197 requests transaction information from system server 160 (step 1920). System server 160 listens for transactions (step 1930), and returns the transaction information to computing device 197 (step 1940). Computing device 197 then displays the transaction information to the developer through an appropriate user interface (step 1950).

Figure 17:
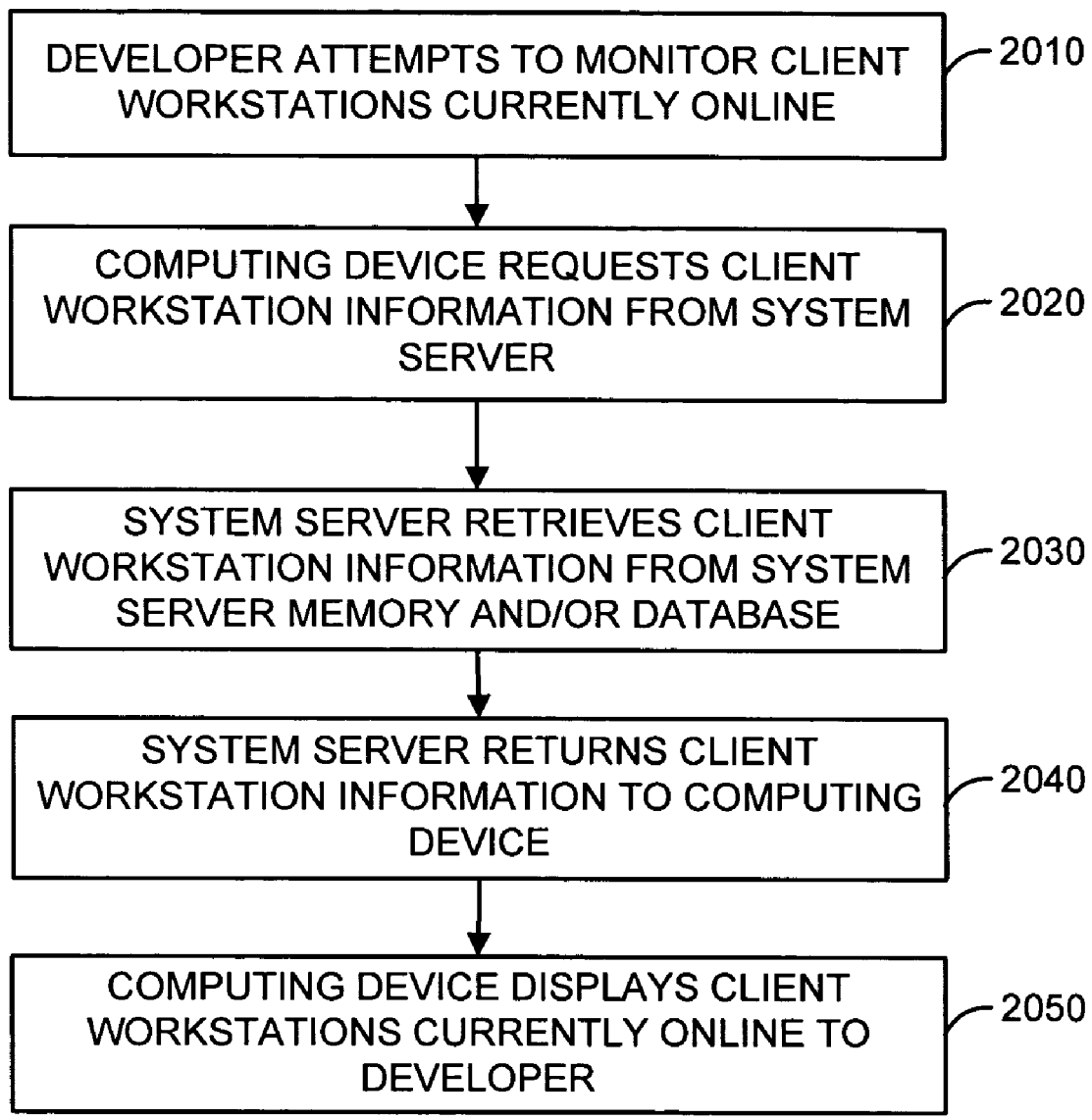
FIG. 17 is a flowchart describing a process for viewing client workstations online in accordance with an embodiment of the present invention.

FIG. 17 describes the interaction between computing device 197 and system server 160 for viewing client workstations 180 online in accordance with an embodiment of the present invention. At step 2010, a developer attempts to monitor which client workstations 180 are currently online. As a result, computing device 197 requests client workstation information from system server 160 (step 2020). System server 160 retrieves the client workstation information from the system server's 160 memory and/or database 370 (step 2030), and returns the client workstation information to computing device 197 (step 2040). Computing device 197 then displays the client workstation information to the developer through an appropriate user interface (step 2050).

It will be appreciated that the scope of the present invention is not limited by the particular embodiments set forth herein. Other appropriate variations, whether explicitly provided for or implied, are contemplated by the present disclosure. For example, the system 100 can be used in conjunction with various additional components, including an interactive voice response system ("IVR"), SQL database, voice recorder, and web server to provide functionality for recording and tracking incoming telephone calls to special service numbers 150. When an incoming call is picked up by a user 130, the user 130 can be informed of the advertising source/distributed media 140 associated with the special service number 150 by way of a telephone message played to the user immediately before the call is handed over to the user 130. It is also contemplated that system 100 can be implemented to rely on such additional components for obtaining caller information.

It is also contemplated that instant messaging technology can be employed for routing caller information between the various applicable components of system 100.

It is also contemplated that system 100 can provide functionality for automatically updating one or more of the various software components employed by system 100.

It is also contemplated that caller information stored, processed, and/or otherwise used by system 100 can be made available to be accessed by, and/or linked from, other software within and/or outside of system 100. For example, it is contemplated that certain embodiments of the present invention can permit software applications of third party vendors to access caller information of system 100.

It is also contemplated that system 100 can provide for and/or support the encryption of communications between various components of the system 100 and/or other systems.

In addition, it is contemplated that system 100 can be used in a wide variety of industries, including but not limited to real property management, the automotive industry, real estate, hotel management, mass merchandising, vendor management, and any other industry where the functionality described herein may be desirable.

What is claimed is:

1. A system for managing telephone calls, the system comprising:
   a database configured to store caller information;
   a system server coupled to a voice network and a computer network and in communication with said database, wherein said system server is configured to:
   provide an internet connection to the system server over the computer network;
   extract information from an incoming telephone call on the voice network, wherein said incoming telephone call is placed to a special service number by a caller responding to an advertisement in a distributed media publication, and
   cross-reference said extracted information with said stored caller information of said database to obtain cross-referenced caller information;
   and
   a remote client workstation in communication with said system server over the internet connection, wherein said remote client workstation is configured to:

receive said cross-referenced caller information from said system server over the internet connection, display a list of a plurality of incoming telephone calls to a user for selection, display said cross-referenced caller information in response to said user's selection of an incoming telephone call in said list of the plurality of incoming telephone calls, receive updated caller information input by said user, pass said updated caller information over the internet connection to said system server, said remote client workstation is further configured to:

display advertising source information to said user, receive updated advertising source information input by said user, and pass said updated advertising source information to said system server.

2. The system of claim 1, wherein:
said system server is further configured to store said updated caller information in said database.

3. The system of claim 1, wherein
the system server includes a telephony server coupled to the voice network wherein said telephony server is configured to provide said extracted information to said system server.

4. The system of claim 1, wherein:
said extracted information is ANI information.

5. The system of claim 1, wherein:
said extracted information is DNIS information.

6. The system of claim 1, wherein:
said remote client workstation and said user are located at an office of an advertiser.

7. The system of claim 1, wherein:
said system is adapted for managing caller information for the multi-housing industry.

8. A system for managing telephone calls, the system comprising:

a database configured to store caller information;

a system server coupled to a voice network and a computer network and in communication with said database, wherein said system server is configured to:

provide an internet connection to the system server over the computer network;

extract information from an incoming telephone call on the voice network, and cross-reference said extracted information with said stored caller information of said database to obtain cross-referenced caller information; and a remote client workstation in communication with said system server over the internet connection, wherein said remote client workstation is configured to:

receive said cross-referenced caller information from said system server over the internet connection, display a list of a plurality of incoming telephone calls to a user for selection, display said cross-referenced caller information in response to said user's selection of an incoming telephone call in said list of the plurality of incoming telephone calls, receive updated caller information input by said user, pass said updated caller information over the internet connection to said system server, display office representatives information to said user, receive updated office representatives information input by said user, and pass said updated office representatives information to said system server.

9. The system of claim 8, wherein:
said system server is further configured to:
generate a report in response to a request received from said remote client workstation,
wherein said report comprises caller information, and
pass said report to said remote client workstation.

10. The system of claim 8, wherein:
said system server is further configured to:
retrieve a record in response to a request received from said remote client workstation, wherein said record comprises caller information, and
pass said record to said remote client workstation.

11. The system of claim 8, further comprising:
a computing device for monitoring performance of said system,
wherein said computing device is in communication with said system server,
wherein said computing device is configured to:
request transaction information from said system server,
receive said transaction information from said system server, and
display said transaction information to a developer.

12. The system of claim 8, further comprising:
a plurality of remote client workstations in communication with said system server.

13. The system of claim 12, further comprising:
a computing device for monitoring whether each of said client workstations is online, wherein said computing device is in communication with said system server, wherein said computing device is configured to:
request remote client workstation information from said system server,
receive remote said client workstation information from said system server, and
display remote said client workstation information to a developer.

14. The system of claim 8, wherein:
at least a portion of said caller information of said database comprises customer information of a walk-in customer.

15. The system of claim 8, wherein:
at least a portion of said caller information of said database comprises customer information of a caller customer.

16. The system of claim 8, wherein:
said system server is further configured to store said updated caller information in said database.

17. The system of claim 8, wherein
the system server includes a telephony server coupled to the voice network wherein said telephony server is configured to provide said extracted information to said system server.

18. The system of claim 8, wherein:
said extracted information is ANI information.

19. The system of claim 8, wherein:
said extracted information is DNIS information.

20. The system of claim 8, wherein:
said remote client workstation and said user are located at an office of an advertiser.

21. The system of claim 8, wherein:
said system is adapted for managing caller information for the multi-housing industry.

* * * * *